United States Patent
Shinozaki

(10) Patent No.: US 9,170,739 B2
(45) Date of Patent: Oct. 27, 2015

(54) RELAY APPARATUS AND RELAY METHOD

(75) Inventor: Yoshinari Shinozaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 13/569,223

(22) Filed: Aug. 8, 2012

(65) Prior Publication Data

US 2013/0046875 A1 Feb. 21, 2013

(30) Foreign Application Priority Data

Aug. 17, 2011 (JP) .................... 2011-178467

(51) Int. Cl.
*G06F 15/16* (2006.01)
*G06F 21/00* (2013.01)
*G06F 3/06* (2006.01)
*G06F 11/20* (2006.01)
*H04L 29/08* (2006.01)

(52) U.S. Cl.
CPC .............. *G06F 3/0607* (2013.01); *G06F 3/067* (2013.01); *G06F 3/0647* (2013.01); *G06F 11/2064* (2013.01); *H04L 67/288* (2013.01); *H04L 67/2828* (2013.01); *H04L 67/2842* (2013.01)

(58) Field of Classification Search
CPC ..... H04L 61/00; H04L 61/6009; H04L 67/06; H04L 67/2828; H04L 67/288; H04L 67/2842; G06F 3/0607; G06F 3/067; G06F 3/0647; G06F 11/2064
USPC ....................... 709/229, 233; 707/899; 705/59
See application file for complete search history.

(56) References Cited

U.S. PATENT DOCUMENTS

| | | | | |
|---|---|---|---|---|
| 7,027,583 B2 * | 4/2006 | Uranaka et al. | ........... | 379/220.01 |
| 7,328,353 B2 * | 2/2008 | Yamauchi et al. | ............ | 713/193 |
| 7,337,353 B2 * | 2/2008 | Yamamoto et al. | .......... | 714/47.2 |
| 7,584,294 B2 * | 9/2009 | Plamondon | .................. | 709/233 |
| 7,594,137 B2 * | 9/2009 | Kawaguchi et al. | ........... | 714/6.3 |
| 7,769,721 B2 * | 8/2010 | Ueoka et al. | ................... | 707/679 |
| 7,971,011 B2 * | 6/2011 | Furukawa et al. | ............ | 711/161 |
| 8,010,837 B2 * | 8/2011 | Kawaguchi et al. | ........... | 714/6.3 |

(Continued)

FOREIGN PATENT DOCUMENTS

| | | |
|---|---|---|
| JP | 2003-167684 | 6/2003 |
| JP | 2006-155202 | 6/2006 |

(Continued)

OTHER PUBLICATIONS

Japanese Office Action mailed Mar. 10, 2015 for corresponding Japanese Patent Application No. 2011-178467, with Partial English Translation, 5 pages.

*Primary Examiner* — Viet Vu
*Assistant Examiner* — Michael A Chambers
(74) *Attorney, Agent, or Firm* — Fujitsu Patent Center

(57) ABSTRACT

A management information storage section included in a relay apparatus stores first management information for managing an address of a first buffer which stores data transmitted from a first apparatus to a second apparatus and second management information for managing an address of a second buffer corresponding to the first buffer. An information processing section swaps the address of the first buffer managed by the first management information for the address of the second buffer managed by the second management information. A transmission section transmits to the second apparatus data stored at the address of the first buffer swapped between the first management information and the second management information.

5 Claims, 22 Drawing Sheets

(56) References Cited

U.S. PATENT DOCUMENTS

| | | |
|---|---|---|
| 8,010,952 B2 * | 8/2011 | Datla et al. .................... 717/143 |
| 8,112,362 B2 * | 2/2012 | Abei .............................. 705/59 |
| 8,175,529 B2 * | 5/2012 | Wakasa et al. ............... 455/41.2 |
| 8,275,829 B2 * | 9/2012 | Plamondon .................. 709/203 |
| 2003/0154390 A1 * | 8/2003 | Yamauchi et al. ............ 713/193 |
| 2005/0268147 A1 * | 12/2005 | Yamamoto et al. ............... 714/2 |
| 2007/0174673 A1 * | 7/2007 | Kawaguchi et al. .............. 714/6 |
| 2008/0172716 A1 * | 7/2008 | Talpade et al. .................. 726/1 |
| 2008/0228938 A1 * | 9/2008 | Plamondon .................. 709/233 |
| 2009/0077134 A1 * | 3/2009 | Ueoka et al. .................. 707/200 |
| 2009/0234896 A1 * | 9/2009 | Takaoka ........................ 707/204 |
| 2009/0287837 A1 * | 11/2009 | Felsher ......................... 709/229 |
| 2009/0287842 A1 * | 11/2009 | Plamondon .................. 709/233 |
| 2010/0011239 A1 * | 1/2010 | Kawaguchi et al. .............. 714/6 |
| 2010/0042795 A1 * | 2/2010 | Uchida ......................... 711/162 |
| 2010/0217942 A1 | 8/2010 | Kondo |
| 2010/0292857 A1 * | 11/2010 | Bose et al. .................... 700/292 |
| 2011/0004914 A1 * | 1/2011 | Ennis et al. ...................... 726/1 |

FOREIGN PATENT DOCUMENTS

| | | |
|---|---|---|
| JP | 2006-260292 | 9/2006 |
| JP | 2010-198171 A | 9/2010 |
| WO | WO-2008/139545 | 11/2008 |

* cited by examiner

FIG. 4

210a COMMAND PARAMETER

| MEMBER NAME | PARAMETER |
| --- | --- |
| COPY SOURCE SESSION ID | 0x0001 |
| COPY DESTINATION SESSION ID | 0x0001 |
| REC OPERATION MODE FLAG | 0x01 |
| REC TRANSFER MODE | 0x03 |
| COPY SOURCE VOLUME NUMBER | 0x0001 |
| COPY DESTINATION VOLUME NUMBER | 0x0011 |
| COPY SOURCE VOLUME START LBA | 0x00001000 |
| COPY DESTINATION VOLUME START LBA | 0x00004000 |
| COPY RANGE | 0x10000000 |
| COPY SOURCE APPARATUS ID | SCR_STORAGE_UNIT01XXXX |
| COPY DESTINATION APPARATUS ID | DST_STORAGE_UNIT02XXXX |
| RELAY APPARATUS ID | RELAY_STORAGE_UNIT03XXXX |

FIG. 6

240a REC BUFFER MANAGEMENT TABLE

| MEMBER NAME | PARAMETER |
|---|---|
| APPARATUS ID | SCR_STORAGE_UNIT01XXXX |
| REC BUFFER GROUP ID | 0x00 |
| CONNECTION DESTINATION APPARATUS ID | RELAY_STORAGE_UNIT03XXXX |
| TYPE | 0x00 |
| SIZE | 0x01 |
| USE | 0x01 |
| TRANSFER INTERVAL | 0x01 |
| MONITORING TIME | 0x01 |
| HALT WAIT TIMER | 0x01 |
| RELAY FUNCTION | 0x00 |

FIG. 7

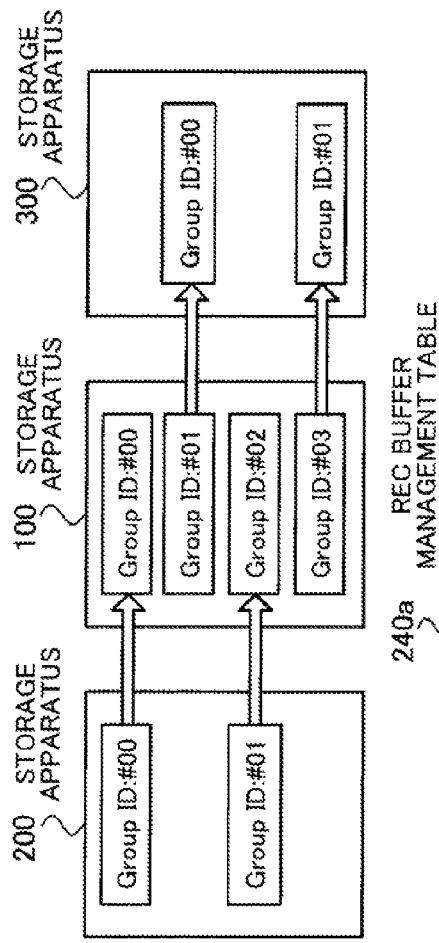

240a REC BUFFER MANAGEMENT TABLE

| APPARATUS ID | REC BUFFER GROUP ID | CONNECTION DESTINATION APPARATUS ID | TYPE | SIZE | USE | TRANSFER INTERVAL | MONITORING TIME | HALT WAIT TIMER | RELAY FUNCTION |
|---|---|---|---|---|---|---|---|---|---|
| A | #00 | B | O | ARBITRARY | TRANS-MISSION | ARBITRARY | ARBITRARY | ARBITRARY | VALID |
| B | #00 | A | O | ARBITRARY | RECEIVING | ARBITRARY | ARBITRARY | ARBITRARY | VALID |
| B | #01 | C | O | ARBITRARY | TRANS-MISSION | ARBITRARY | ARBITRARY | ARBITRARY | VALID |
| C | #00 | B | O | ARBITRARY | RECEIVING | ARBITRARY | ARBITRARY | ARBITRARY | VALID |
| A | #01 | B | O | ARBITRARY | TRANS-MISSION | ARBITRARY | ARBITRARY | ARBITRARY | INVALID |
| B | #02 | A | O | ARBITRARY | RECEIVING | ARBITRARY | ARBITRARY | ARBITRARY | INVALID |
| B | #03 | C | M | ARBITRARY | TRANS-MISSION | ARBITRARY | ARBITRARY | ARBITRARY | INVALID |
| C | #01 | B | M | ARBITRARY | RECEIVING | ARBITRARY | ARBITRARY | ARBITRARY | INVALID |

FIG. 8

130a BUFFER IDENTIFY TABLE

| MEMBER NAME | PARAMETER | |
|---|---|---|
| STATE | 0x01 | |
| BUFFER ID | 0x1001 | |
| SIZE | 0x08 | |
| NUMBER OF PIECES OF DATA STORED | 0x0064 | |
| BUFFER ADDRESS | 0x0000000020400000 | |
| ATTRIBUTE DATA | SESSION MANAGEMENT TABLE NUMBER | 0x20 |
| | COPY SOURCE VOLUME NUMBER | 0x0001 |
| | COPY DESTINATION VOLUME NUMBER | 0x0011 |
| | COPY SOURCE VOLUME START LBA | 0x00001000 |
| | COPY DESTINATION VOLUME START LBA | 0x00004000 |
| | BLOCK SIZE | 0x10000000 |

FIG. 9

150a  BUFFER SET TABLE

| MEMBER NAME | PARAMETER | | |
|---|---|---|---|
| BUFFER SET TABLE ID | 0x0001 | | |
| BUFFER ID | CMID | SOURCE BUFFER ID | DESTINATION BUFFER ID |
| | CM10 | 0x1001 | 0x1011 |
| | CM11 | 0x1101 | 0x1111 |
| RELAY TRANSMIT GROUP ID | 0x0001 | | |
| RELAY TRANSMIT BUFFER SET TABLE ID | 0x0001 | | |

FIG. 20

| | 10a | | 10b |
|---|---|---|---|
| 150a1 | | 150b1 BUFFER SET TABLE | |

| BUFFER SET TABLE ID | 0x0001 | BUFFER SET TABLE ID | 0x0001 |
|---|---|---|---|
| BUFFER ID | CM10:0x1001 CM11:0x1111 | BUFFER ID | CM10:0x1001 CM11:0x1111 |
| RELAY TRANSMIT GROUP ID | 0x0001 | RELAY TRANSMIT GROUP ID | 0x0001 |
| RELAY TRANSMIT BUFFER SET TABLE ID | 0x0002 | RELAY TRANSMIT BUFFER SET TABLE ID | 0x0002 |
| STATE | – | STATE | – |
| BUFFER ID | 0x1001 | BUFFER ID | 0x1001 |
| SIZE | 0x08 | SIZE | 0x08 |
| NUMBER OF PIECES OF DATA STORED | – | NUMBER OF PIECES OF DATA STORED | – |
| BUFFER ADDRESS | 0x0000000020400000 | BUFFER ADDRESS | 0x0000000020400000 |
| ATTRIBUTE DATA | ... | ATTRIBUTE DATA | ... |

130a1 on left, 130b1 on right

| REC OBJECT DATA | D3 161a BUFFER | REC OBJECT DATA | D5 161b BUFFER |
|---|---|---|---|
| (0x0000000020400000) | | (0x0000000020400000) | |

150a2 / 150b2

| BUFFER SET TABLE ID | 0x0002 | BUFFER SET TABLE ID | 0x0002 |
|---|---|---|---|
| BUFFER ID | CM10:0x2001 CM11:0x2111 | BUFFER ID | CM10:0x2001 CM11:0x2111 |
| RELAY TRANSMIT GROUP ID | – | RELAY TRANSMIT GROUP ID | – |
| RELAY TRANSMIT BUFFER SET TABLE ID | – | RELAY TRANSMIT BUFFER SET TABLE ID | – |
| STATE | – | STATE | – |
| BUFFER ID | 0x2001 | BUFFER ID | 0x2111 |
| SIZE | 0x08 | SIZE | 0x08 |
| NUMBER OF PIECES OF DATA STORED | – | NUMBER OF PIECES OF DATA STORED | – |
| BUFFER ADDRESS | 0x0000000080400000 | BUFFER ADDRESS | 0x0000000080400000 |
| ATTRIBUTE DATA | – | ATTRIBUTE DATA | – |

130a2 on left, 130b2 on right

162a BUFFER (0x0000000080400000) | 162b BUFFER (0x0000000080400000)

FIG. 21

| | 150a1 / 10a | | 150b1 BUFFER SET TABLE 10b | |
|---|---|---|---|---|
| BUFFER SET TABLE ID | 0x0001 | | BUFFER SET TABLE ID | 0x0001 |
| BUFFER ID | CM10:0x1001 CM11:0x1111 | | BUFFER ID | CM10:0x1001 CM11:0x1111 |
| RELAY TRANSMIT GROUP ID | 0x0001 | | RELAY TRANSMIT GROUP ID | 0x0001 |
| RELAY TRANSMIT BUFFER SET TABLE ID | 0x0002 | 130a1 | RELAY TRANSMIT BUFFER SET TABLE ID | 0x0002 | 130b1 |
| STATE | – | | STATE | – |
| BUFFER ID | 0x1001 | | BUFFER ID | 0x1001 |
| SIZE | 0x08 | | SIZE | 0x08 |
| NUMBER OF PIECES OF DATA STORED | – | | NUMBER OF PIECES OF DATA STORED | – |
| BUFFER ADDRESS | 0x0000000080400000 | | BUFFER ADDRESS | 0x0000000080400000 |
| ATTRIBUTE DATA | ... | | ATTRIBUTE DATA | ... |

REC OBJECT DATA  D3 / 161a BUFFER (0x0000000020400000)

REC OBJECT DATA  D5 / 161b BUFFER (0x0000000020400000)

| | 150a2 | | 150b2 | |
|---|---|---|---|---|
| BUFFER SET TABLE ID | 0x0002 | | BUFFER SET TABLE ID | 0x0002 |
| BUFFER ID | CM10:0x2001 CM11:0x2111 | | BUFFER ID | CM10:0x2001 CM11:0x2111 |
| RELAY TRANSMIT GROUP ID | – | | RELAY TRANSMIT GROUP ID | – |
| RELAY TRANSMIT BUFFER SET TABLE ID | – | 130a2 | RELAY TRANSMIT BUFFER SET TABLE ID | – | 130b2 |
| STATE | – | | STATE | – |
| BUFFER ID | 0x2001 | | BUFFER ID | 0x2111 |
| SIZE | 0x08 | | SIZE | 0x08 |
| NUMBER OF PIECES OF DATA STORED | – | | NUMBER OF PIECES OF DATA STORED | – |
| BUFFER ADDRESS | 0x0000000020400000 | | BUFFER ADDRESS | 0x0000000020400000 |
| ATTRIBUTE DATA | – | | ATTRIBUTE DATA | – |

162a BUFFER (0x0000000080400000)

162b BUFFER (0x0000000080400000)

RELAY APPARATUS AND RELAY METHOD

CROSS-REFERENCE TO RELATED APPLICATION

This application is based upon and claims the benefit of priority of the prior Japanese Patent Application No. 2011-178467, filed on Aug. 17, 2011, the entire contents of which are incorporated herein by reference.

FIELD

The embodiments discussed herein are related to a relay apparatus and a relay method.

BACKGROUND

A storage system including a host apparatus and a storage apparatus which stores data for the host apparatus is known.

A technique for duplicating data and recording it on a plurality of disks is known. This technique is used for, for example, improving the performance or reliability of an ordinary storage system. In addition, a remote copy function for installing a plurality of storage apparatus at places distant from one another and keeping data stored in them equivalent is known.

A technique for preserving a measure to perform recovery by controlling and guaranteeing the order in which a storage apparatus is written by a database itself even in the case of the occurrence of a failure in an apparatus, such as a server, or a disaster is known. With storage apparatus using the remote copy function, a technique for storing data written by a host apparatus in a mirrored storage apparatus while maintaining the order in which the data is transferred is known. The host apparatus which is in operation may go down due to a disaster. However, if the order is guaranteed, data processing can be continued by the use of a host apparatus included in a spare storage system on the basis of data stored in the mirrored storage apparatus.

Furthermore, with remote copy it is known that an increase in the distance of a connection between a master storage system and a substorage system causes a slow communication response and a delay in data copy. Accordingly, the technique of placing a cache disk between the master storage system and the sub storage system for temporarily storing copy object data is known.

Japanese Laid-open Patent Publication No. 2006-260292
International Publication Pamphlet No. WO/2008/139545
Japanese Laid-open Patent Publication No. 2006-155202

FIGS. 22A and 22B are examples of a remote copy control method by a storage apparatus.

FIG. 22A is an example of realizing mirroring by transferring data between dedicated buffers 72 of controller modules 74 (CM0 and CM1) in a copy source storage apparatus 71 and dedicated buffers 82 of controller modules 84 (CM0 and CM1) in a storage apparatus 81 remotely connected to the storage apparatus 71.

1) The copy source storage apparatus 71 temporarily stores data I/O(1) through I/O(5) from a host in disk units 73 and then stores them in the transfer buffers 72.

2) Data is transferred periodically from the buffers 72 in the copy source storage apparatus 71 to the buffers 82 in the copy destination storage apparatus 81. When the copy source storage apparatus 71 transfers the data from the buffers 72 to the copy destination storage apparatus 81, the copy source storage apparatus 71 synchronizes the CM0 to the CM1 with respect to transfer timing.

3) The copy destination storage apparatus 81 stores the data transferred from the copy source storage apparatus 71 in disk units 83. At this time the copy destination storage apparatus 81 synchronizes the CM0 to the CM1 with respect to timing at which the data is outputted from the buffers 82.

There are a plurality of buffers 72 and a plurality of buffers 82. When the data is transferred from the copy source storage apparatus 71 to the copy destination storage apparatus 81, the order in which the data is transferred from the plurality of buffers 72 and the order in which the data is outputted from the plurality of buffers 82 are maintained and the plurality of buffers 72 are associated with the plurality of buffers 82. As a result, the order in which the data is transferred is guaranteed in the copy destination storage apparatus 81.

By the way, the concept of preventing data from being lost in a system has recently spread. A method in which mirroring is performed not via only one apparatus but via one or more apparatus is known. As illustrated in FIG. 22B, for example, a storage apparatus 91 placed for relay between a storage apparatus 71 and a storage apparatus 81 includes a controller module 93 with buffers 92 and a controller module 95 with buffers 94.

1) Data which is transferred from the copy source storage apparatus 71 and which is stored in buffers 92 is temporarily stored in disk units 96. The data in the buffers 92 is outputted to the disk units 96 in parallel, so data transfer order is not taken into consideration.

2) After the data stored in the disk units 96 is stored in buffers 94, the data is transferred to the copy destination storage apparatus 81. The data is stored in the buffers 94 in the order in which the data is written to the disk units 96. Accordingly, as stated above, when the data is transferred to the storage apparatus 81, data transfer order is not guaranteed.

Remote copy between the storage apparatus 91 and the storage apparatus 71 and remote copy between the storage apparatus 91 and the storage apparatus 81 which are independent of each other are managed. As a result, data transfer order among a plurality of apparatus cannot be guaranteed.

SUMMARY

According to an aspect of the invention, a relay apparatus includes a management information storage section which stores first management information for managing an address of a first storage area in which data transmitted from a first apparatus to a second apparatus is stored and second management information for managing an address of a second storage area corresponding to the first storage area, an information processing section which swaps the address of the first storage area managed by the first management information for the address of the second storage area managed by the second management information, and a transmission section which transmits to the second apparatus data stored at the address of the first storage area swapped between the first management information and the second management information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a view for describing a command parameter;

FIG. 6 is a view for describing REC buffer management data;

FIG. 7 is a view for describing an example of setting a combination of REC buffers;

FIG. 8 is a view for describing buffer identify data;

FIG. 9 is a view for describing buffer set data;

FIG. 20 is a view for describing a concrete example of a process for transmitting REC object data to a storage apparatus;

FIG. 21 is a view for describing a concrete example of a process for transmitting REC object data to a storage apparatus.

DESCRIPTION OF EMBODIMENTS

Figure 1:
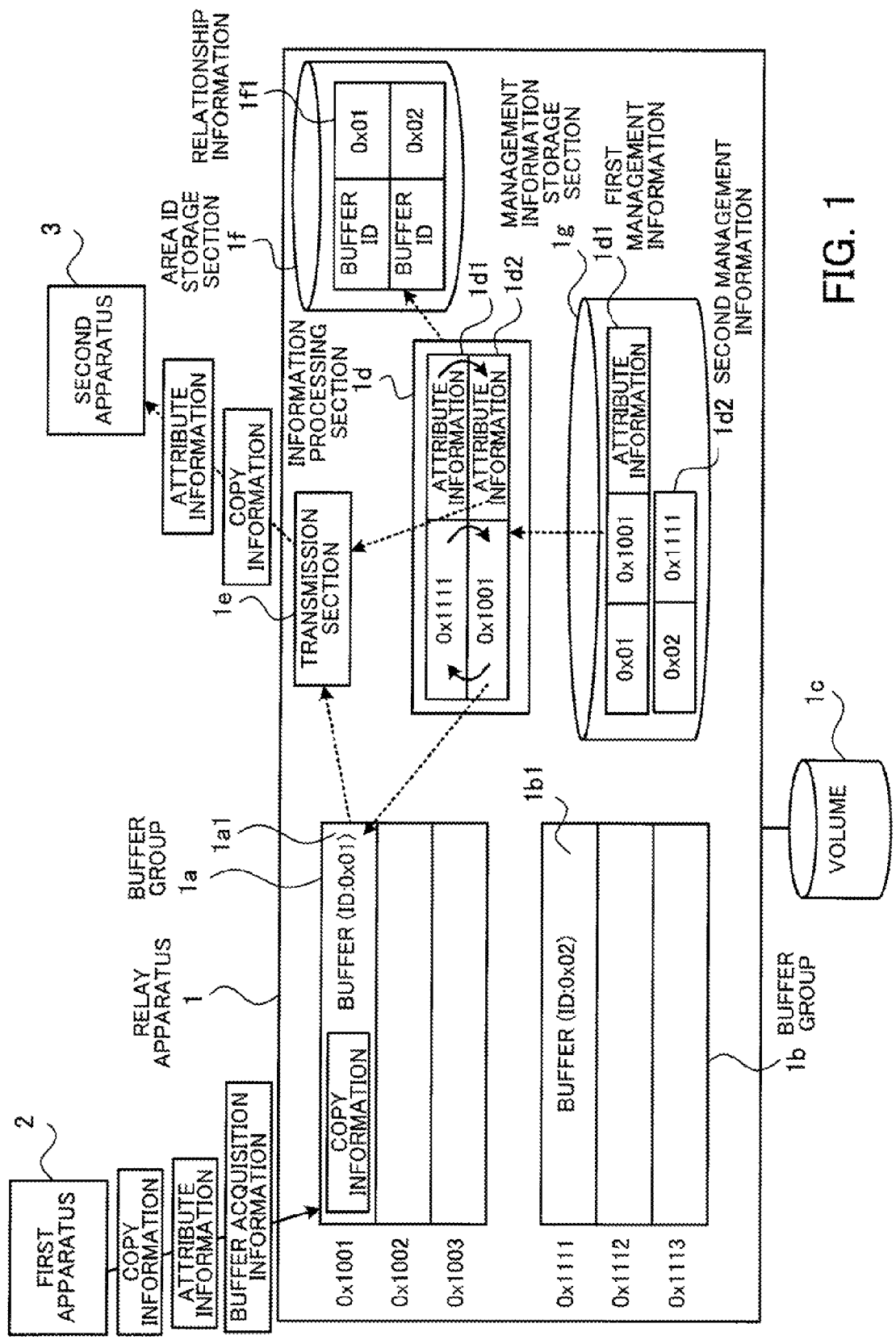
FIG. 1 illustrates a relay apparatus according to a first embodiment.

A relay apparatus according to an embodiment will now be described in detail with reference to the accompanying drawings, wherein like reference numerals refer to like elements throughout.

First Embodiment

FIG. 1 illustrates a relay apparatus according to a first embodiment.

A relay apparatus (computer) 1 according to a first embodiment relays data (copy object information (copy information), for example) transmitted from a first apparatus 2 to a second apparatus 3. The relay apparatus 1 is connected to the first apparatus 2 and the second apparatus 3 via a network.

The first apparatus 2 copies copy information to the second apparatus 3 by the use of an inter-enclosure remote copy (REC) function. An inter-enclosure remote copy function is a function for copying via the relay apparatus 1 copy information stored in a volume (not illustrated) of the first apparatus 2 designated as a copy source to a volume of the second apparatus 3 designated as a copy destination. When copying the copy information between the first apparatus 2 and the second apparatus 3 is completed, the copy information stored in the volume of the first apparatus 2 becomes equivalent in contents to copy information stored in the volume of the second apparatus 3.

Each of the first apparatus 2, the relay apparatus 1, and the second apparatus 3 includes a plurality of buffers. The plurality of buffers included in the first apparatus 2, the plurality of buffers included in the relay apparatus 1, and the plurality of buffers included in the second apparatus 3 correspond to one another. These buffers can be realized by the use of, for example, RAMs (Random Access Memories). Copy information stored in a buffer of the first apparatus 2 is transmitted to the relay apparatus 1, for example, when all storage areas in the buffer become full or when a certain period of time elapses after the time copy information is stored first.

The relay apparatus 1 transfers the copy information to the second apparatus 3 in first transfer mode or second transfer mode. The relay apparatus 1 can perform switching between the first transfer mode and the second transfer mode in accordance with instructions from a management apparatus (not illustrated). The first transfer mode and the second transfer mode will now be described in order.

(First Transfer Mode)

With the first transfer mode the relay apparatus 1 receives buffer acquisition data transmitted prior to copy information. The relay apparatus 1 which receives the buffer acquisition data reserves a buffer (buffer 1$a$1, for example) included in a buffer group 1$a$ made up of a plurality of buffers for storing copy information transmitted from the first apparatus 2. When after that copy information is transmitted from the first apparatus 2, the relay apparatus 1 receives the copy information and stores it in the reserved buffer 1$a$1. When the relay apparatus 1 receives all copy information, the relay apparatus 1 stores it in a volume 1$c$. After that, the relay apparatus 1 reserves a buffer (buffer 1$b$1, for example) included in a buffer group 1$b$ made up of a plurality of buffers for storing copy information transmitted to the second apparatus 3. The relay apparatus 1 then stores in (writes to) the reserved buffer 1$b$1 the copy information stored in the volume 1$c$.

In addition, the relay apparatus 1 requests the first apparatus 2 to free a buffer of the first apparatus 2 in which copy information is stored. When after that the relay apparatus 1 performs processes, the relay apparatus 1 is not synchronized to the first apparatus 2. When copy information is stored in all storage areas in the buffer 1$b$1 or when a certain period of time elapses after the time copy information is stored first, the relay apparatus 1 transmits copy information stored in the buffer 1$b$1 to the second apparatus 3. When the second apparatus 3 receives the copy information, the second apparatus 3 stores it in a volume included therein. After that, the second apparatus 3 requests the relay apparatus 1 to free the buffer 1$b$1.

With the first transfer mode there are cases where copy information the transmission of which to the second apparatus 3 is not yet completed remains in the buffer 1$b$1 at the time of storing in the buffer 1$b$1 copy information stored in the volume 1$c$. The reason for this is as follows. As stated above, when copy information is stored in all the storage areas in the buffer 1$b$1 or when a certain period of time elapses after the time copy information is stored first, copy information stored in the buffer 1$b$1 is transmitted to the second apparatus 3. If copy information the transmission of which to the second apparatus 3 is not yet completed remains in the buffer 1$b$1, then the relay apparatus 1 stores it in a buffer other than the buffer 1$b$1. As a result, there may be a change in the order in which copy information is transferred.

(Second Transfer Mode)

The relay apparatus 1 includes an information processing section 1d, a transmission section 1e, an area ID storage section 1f, and a management information storage section 1g which operate in second transfer mode.

The information processing section 1d and the transmission section 1e can be realized by the functions of a CPU (Central Processing Unit) which is not illustrated and which is included in the relay apparatus 1. With the second transfer mode, the buffer 1a1 is an example of a first storage area and the buffer 1b1 is an example of a second storage area.

The information processing section 1d receives buffer acquisition information transmitted from the first apparatus 2 prior to copy information. The information processing section 1d which receives the buffer acquisition information reserves the buffer 1a1 and buffer 1b1 in which copy information is not stored. The information processing section 1d then stores in the area ID storage section 1f relationship information 1f1 by which the ID "0x01" of the reserved buffer 1a1 is associated with the ID "0x02" of the reserved buffer 1b1.

When after that the information processing section 1d receives attribute information for identifying a copy source area in a volume of the first apparatus 2 in which copy information is stored and a copy destination area in a volume of the second apparatus 3, the information processing section 1d refers to the relationship information 1f1 and generates management information 1d1 by which the ID "0x01" of the buffer 1a1 is associated with the attribute information and the address "0x1001" of the buffer 1a1. In addition, the information processing section 1d generates management information 1d2 by which the ID "0x02" of the buffer 1b1 is associated with the address "0x1111" of the buffer 1b1. The information processing section 1d stores the generated management information 1d1 and management information 1d2 in the management information storage section 1g.

When after that the information processing section 1d receives copy information transmitted from the first apparatus 2 to the second apparatus 3, the information processing section 1d stores the received copy information in the buffer 1a1. The information processing section 1d then refers to the relationship information 1f1 stored in the area ID storage section 1f, and checks that the buffer 1a1 is associated with the buffer 1b1. The information processing section 1d refers to the management information storage section 1g and swaps the address "0x1001" of the buffer 1a1 included in the management information 1d1 for the address "0x1111" of the buffer 1b1 included in the management information 1d2. In addition, the information processing section 1d copies the attribute information included in the management information 1d1 to the management information 1d2.

When after that the relay apparatus 1 performs processes, the relay apparatus 1 is not synchronized to the first apparatus 2. The relay apparatus 1 requests the first apparatus 2 to free the buffer 1a1 of the first apparatus 2 in which the copy information is stored.

The transmission section 1e refers to the management information 1d2 the address in which is swapped by the information processing section 1d at the time of the transmission of the copy information to the second apparatus 3, and transmits the attribute information included in the management information 1d2 to the second apparatus 3. After that, the transmission section 1e transmits the copy information stored at the address "0x1001" included in the management information 1d2 to the second apparatus 3. This makes it possible to transfer the copy information stored in the buffer 1a1 to the second apparatus 3 without storing the copy information in the buffer 1b1. Accordingly, if copy information is transmitted via the relay apparatus 1, the order in which the copy information is transmitted can be guaranteed.

Furthermore, by adopting the second transfer mode, the trouble of storing copy information in the volume 1c and storing it again in the buffer 1b1 can be saved.

In the first embodiment the relay apparatus 1 which operates in the first transfer mode and the second transfer mode is described. However, the relay apparatus 1 need only operate in the second transfer mode. It is not necessary for the relay apparatus 1 to operate in the first transfer mode.

The disclosed relay apparatus will now be described more concretely in a second embodiment.

Second Embodiment

Figure 2:
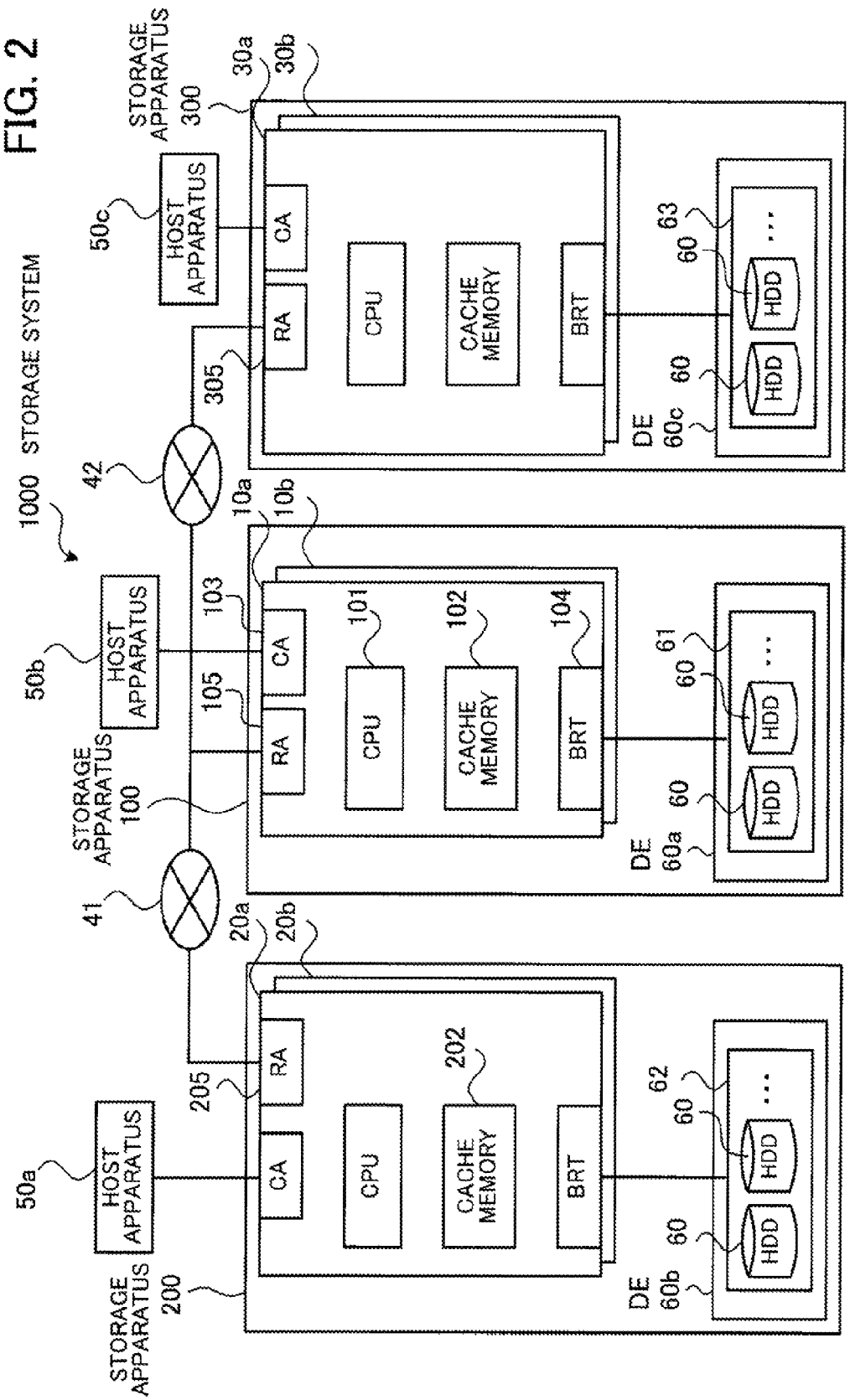
FIG. 2 is a block diagram of a storage system according to a second embodiment.

FIG. 2 is a block diagram of a storage system according to a second embodiment.

A storage system 1000 includes storage apparatus 100, 200, and 300 and host apparatus 50b, 50a, and 50c connected to the storage apparatus 100, 200, and 300 respectively.

The storage apparatus 100 has the function of transmitting REC (Remote Equivalent Copy) object data transmitted from the storage apparatus 200 to the storage apparatus 300 with transfer order guaranteed.

The hardware configuration of the storage apparatus 100, 200, and 300 is the same. Accordingly, the hardware configuration of the storage apparatus 100 will now be described and descriptions of the hardware configuration of the storage apparatus 200 and 300 will be omitted.

The storage apparatus 100 is connected to the host apparatus 50b via an FC (Fibre Channel) switch not illustrated. In FIG. 2, one host apparatus 50b is connected to the storage apparatus 100. However, a plurality of host apparatus may be connected to the storage apparatus 100.

The storage apparatus 100 includes a DE (Drive Enclosure) 60a including a plurality of HDDs 60 and CMs (Controller Modules) 10a and 10b which manage physical storage areas of the drive enclosure 60a by RAID (Redundant Arrays of Inexpensive/Independent Disks). In this embodiment an HDD 60 is indicated as an example of a storage medium included in the drive enclosure 60a. However, another storage medium, such as an SSD, may be used. If no distinctions are made among the plurality of HDDs 60 included in the drive enclosure 60a, hereinafter the term "HDD 60 group" will be used. The total capacity of the HDD 60 group is, for example, 600 GB (GigaBytes) to 240 TB (TeraBytes).

By using the two controller modules 10a and 10b for operation, redundancy is ensured in the storage apparatus 100. The number of controller modules included in the storage apparatus 100 is not limited to two. Three or more controller modules may be used to ensure redundancy. Only the controller module 10a may be used.

The controller modules 10a and 10b are realized by adopting the same hardware configuration.

Each of the controller modules 10a and 10b controls access to data in a physical storage area of an HDD 60 included in the drive enclosure 60a by RAID in response to a data access request from the host apparatus 50b.

The controller modules 10a and 10b are realized by adopting the same hardware configuration. Accordingly, the hardware configuration of the controller module 10a will be described and descriptions of the hardware configuration of the controller module 10b will be omitted.

The controller module 10a includes a CPU 101, a cache memory 102, a CA (Channel Adapter) 103, a BRT (Back end Router) 104, and an RA (Remote Adapter) 105.

The CPU 101 controls the whole of the controller module 10a by executing a program stored in a flash ROM or the like (not illustrated).

The cache memory 102 temporarily stores data written to the HDD 60 group or data read out from the HDD 60 group.

When the controller module 10a receives, for example, a data read instruction from the host apparatus 50b, the controller module 10a determines whether on not read object data is stored in the cache memory 102. If the read object data is stored in the cache memory 102, then the controller module 10a transmits the read object data stored in the cache memory 102 to the host apparatus 50b. The data can be transmitted rapidly to the host apparatus 50b, compared with a case where the read object data is read out from the HDD 60 group.

In addition, the cache memory 102 may temporarily store data which the CPU 101 needs to perform a process. For example, a volatile semiconductor device, such as an SRAM, can be used as the cache memory 102. Furthermore, there is no special limit to the storage capacity of the cache memory 102. For example, the storage capacity of the cache memory 102 is about 2 to 64 GB.

The channel adapter 103 is connected to the fibre channel switch and is connected to a channel of the host apparatus 50b via the fibre channel switch. The channel adapter 103 provides an interface function for data transmission and receiving between the host apparatus 50b and the controller module 10a.

The BRT 104 is connected to the drive enclosure 60a. The BRT 104 provides an interface function for data transmission and receiving between the HDD 60 group included in the drive enclosure 60a and the cache memory 102. The controller module 10a transmits data to and receives data from the HDD 60 group included in the drive enclosure 60a via the BRT 104.

The RA 105 is connected to an RA 205 of the storage apparatus 200 via a network 41. In addition, the RA 105 is connected to an RA 305 of the storage apparatus 300 via a network 42.

The controller modules 10a and 10b are connected to each other via a router (not illustrated). For example, when a request to write data to the HDD 60 group is made and the data is transmitted from the host apparatus 50b to the controller module 10a via the fibre channel switch, the CPU 101 not only stores the received data in the cache memory 102 but also transmits the received data to the controller module 10b via the router. The controller module 10b then stores the data received by a CPU of the controller module 10b in a cache memory of the controller module 10b. This makes it possible to store the same data in the cache memory 102 of the controller module 10a and the cache memory of the controller module 10b.

A RAID group made up of one or more HDDs 60 of the plurality of HDDs 60 included in the drive enclosure 60a is formed in the drive enclosure 60a. This RAID group may also be referred to as a "virtual disk", an "RLU (RAID Logical Unit)", or the like.

A RAID group 61 the RAID level of which is RAID5 is indicated in the drive enclosure 60a illustrated in FIG. 2. The structure of the RAID group 61 is an example and another structure may be adopted. For example, the RAID group 61 may include any number of HDDs 60. Furthermore, the RAID group 61 may be set to any RAID level. For example, the RAID level of the RAID group 61 may be set to RAID6.

A storage area of HDDs 60 which make up the RAID group 61 is, for example, logically divided and logical volumes are formed in the RAID group 61. An LUN (Logical Unit Number) is set for each logical volume.

The storage system 1000 performs the following copy in order to guarantee the order of REC object data transferred by the use of a REC function (hereinafter referred to as "REC object data").

A controller module 20a includes a buffer formed by a part of a storage area of a cache memory 202. REC object data can be stored in the buffer. In the following description a buffer which stores REC object data will be referred to as a "REC buffer". A controller module 20b also includes a REC buffer. If only the controller module 20a includes a REC buffer, then the capacity of the cache memory 202 which can be used by the controller module 20a for ordinary input-output (I/O) processing decreases. Accordingly, in order to efficiently use hardware, both the controller modules 20a and 20b include REC buffers.

The storage apparatus 200 does not directly store REC object data received from the host apparatus 50a in a REC buffer but holds in the cache memory 202 or the like only data indicative of an area to which the REC object data is written. After the storage apparatus 200 has written the REC object data received from the host apparatus 50a to a RAID group 62, the storage apparatus 200 reads out the REC object data at any timing from the RAID group 62 and stores it in a REC buffer. When a REC buffer included in the controller module 20a or 20b becomes full of REC object data or when a certain period of time elapses after the time REC object data is stored first in a REC buffer, the storage apparatus 200 temporarily stops at the same time the operation of storing REC object data in REC buffers included in the controller modules 20a and 20b in order to determine a REC object data group copied to a RAID group 63 included in the storage apparatus 300. After the storage apparatus 200 determines the REC object data group, the storage apparatus 200 performs REC buffer switching in the controller modules 20a and 20b and continues storing REC object data in new REC buffers. The storage apparatus 200 transfers the determined REC object data group to the storage apparatus 100. When the storage apparatus 100 has received the REC object data group generated by the storage apparatus 200, the storage apparatus 100 gives the storage apparatus 200 notice that it has received the REC object data group. When the storage apparatus 200 receives this notice, the storage apparatus 200 frees the REC buffers in which the REC object data group is stored. By doing these processes, the order of REC object data is guaranteed. In addition, remote copy in which the order in which REC object data is transferred is guaranteed can be realized. In this case, it is not necessary that each time REC object data is written, communication should be performed between the controller modules 10a and 10b included in the storage apparatus 100, between the controller modules 20a and 20b included in the storage apparatus 200, or between controller modules 30a and 30b included in the storage apparatus 300. There are a plurality of REC buffers in each controller module and they operate in parallel. As a result, the series of processes can be performed continuously.

The following functions are included in the storage apparatus 100, 200, and 300 the hardware configuration of which is illustrated in FIG. 2.

Figure 3:
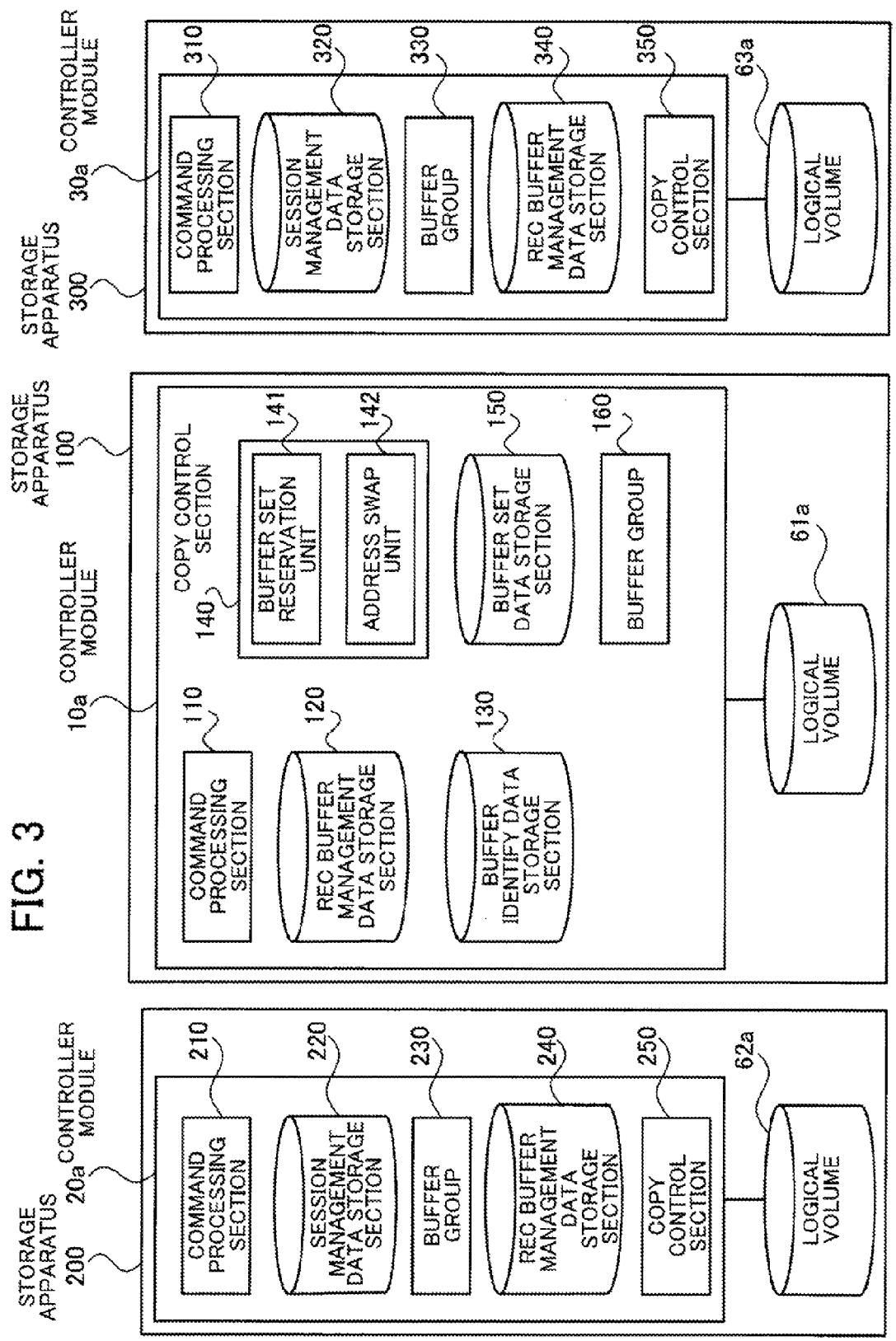
FIG. 3 is a block diagram of the functions of a storage apparatus.

FIG. 3 is a block diagram of the functions of the storage apparatus.

The storage apparatus 200 includes a command processing section 210, a session management data storage section 220, a buffer group 230, a REC buffer management data storage section 240, and a copy control section 250.

The command processing section 210 adds an identifier of a relay apparatus to command parameters issued by the host apparatus 50a, and issues a relay REC start command to the relay apparatus.

The session management data storage section 220 stores session management data for managing a REC session.

The buffer group 230 includes a plurality of REC buffers.

The REC buffer management data storage section 240 stores data (REC buffer management data) for managing a REC buffer which stores REC object data of data stored in the buffer group 230. The REC buffer management data is set by an operator via a management apparatus (not illustrated). The storage apparatus 100 and 300 also store data which is the same as the REC buffer management data stored in the REC buffer management data storage section 240.

The copy control section 250 stores REC object data stored in a logical volume 62a in the storage apparatus 200 in a determined REC buffer of the buffer group 230 in the storage apparatus 200. When a REC buffer becomes full of REC object data or when a certain period of time elapses after the time a REC buffer begins to store REC object data, the copy control section 250 transmits REC object data in the REC buffer in block to the storage apparatus 100 connected to the storage apparatus 200 via the network 41.

The copy control section 250 has the function of guaranteeing order by performing REC buffer switching while maintaining the order of REC object data stored in a plurality of REC buffers. The reason for this is that if a guarantee to write all data in a REC consistency buffer to the storage apparatus 300 can be given, the order of data written by a write command from the host apparatus 50a is maintained.

FIG. 4 is a view for describing a command parameter.

A command parameter 210a includes Copy Source Session ID, Copy Destination Session ID, REC Operation Mode Flag, REC Transfer Mode, Copy Source Volume Number, Copy Destination Volume Number, Copy Source Volume Start LBA (Logical Block Address), Copy Destination Volume Start LBA, Copy Range, Copy Source Apparatus ID, Copy Destination Apparatus ID, and Relay Apparatus ID items.

Copy source session ID is session ID managed by a copy source storage apparatus (storage apparatus 200 in this embodiment). The copy source storage apparatus 200 can arbitrarily set copy source session ID.

Copy destination session ID is session ID managed by a copy destination storage apparatus (storage apparatus 300 in this embodiment). The copy destination storage apparatus 300 can arbitrarily set copy destination session ID.

A REC operation mode flag is a flag for performing designation regarding REC operation. For example, if the storage apparatus 100 is designated as a REC relay apparatus, then "0x01" is set. If synchronous mode is designated, then "0x02" is set.

A REC transfer mode indicates a REC transfer method. A transfer method is synchronous mode in which storage apparatus are synchronized for transfer or asynchronous mode in which storage apparatus are not synchronized for transfer.

A copy source volume number is an LUN of a copy source logical volume (logical volume 62a in this embodiment).

A copy destination volume number is an LUN of a copy destination logical volume (logical volume 63a in this embodiment).

A copy source volume start LBA is an address which indicates a copy start position in a copy source volume by the block.

A copy destination volume start LBA is an address which indicates a copy start position in a copy destination volume by the block.

A copy range is a range of REC object data copied.

Copy source apparatus ID is ID for identifying the storage apparatus 200.

Copy destination apparatus ID is ID for identifying the storage apparatus 300.

Relay apparatus ID is ID for identifying the storage apparatus 100. If a REC operation mode flag is set to "0x01", this relay apparatus ID is also set.

Figure 5:
FIG. 5 is a view for describing session management data.

FIG. 5 is a view for describing session management data.

Session management data is stored in a table.

A session management table 220a includes Session Management Table Number, Copy Source Session ID, Copy Destination Session ID, REC Operation Mode Flag, REC Transfer Mode, Copy Source Volume Number, Copy Destination Volume Number, Copy Source Volume Start LBA, Copy Destination Volume Start LBA, Copy Range, Copy Source Apparatus ID, Copy Destination Apparatus ID, REC Buffer ID, and Relay Apparatus ID items.

The items other than the Session Management Table Number and REC Buffer ID items are the same as those included in the command parameter 210a, so descriptions of them will be omitted. A session management table number is a number for identifying the session management table 220a. When a REC session is updated, a parameter indicative of a REC buffer to which REC object data is copied for transfer is set as REC buffer ID. With a relay REC session group ID of a relay REC buffer is set.

FIG. 6 is a view for describing REC buffer management data.

REC buffer management data is stored in a table.

A REC buffer management table 240a includes Apparatus ID, REC Buffer Group ID, Connection Destination Apparatus ID, Type, Size, Use, Transfer Interval, Monitoring Time, Halt Wait Timer, and Relay Function items.

ID of an apparatus which holds the REC buffer management table 240a is set in the Apparatus ID item.

ID for identifying a REC buffer group formed in the buffer group 230 is set in the REC Buffer Group ID item.

ID of an apparatus to which a REC buffer is connected is set in the Connection Destination Apparatus ID item.

A value for identifying the type of an apparatus which uses the REC buffer is set in the Type item. For example, "0x00" indicates that the REC buffer is open. "0x01" indicates that a mainframe uses the REC buffer.

A value for identifying the size of the REC buffer is set in the Size item. For example, "0x01" indicates that the size of the REC buffer is 128 MB (MegaBytes). "0x02" indicates that the size of the REC buffer is 256 MB.

A value indicative of the use of the REC buffer is set in the Use item. For example, when the REC buffer is used for transmission, "0x01" is set. When the REC buffer is used for receiving, "0x02" is set.

If "0x01" (transmission) is set in the Use item, a value indicative of regular buffer switching time is set in the Transfer Interval item. For example, if buffer switching is performed every second, then "0x01" is set. If buffer switching is performed every two seconds, then "0x02" is set. A transfer interval can be set to any value.

A value indicative of time for which the rate of the use of the REC buffer is monitored is set in the Monitoring Time item. If a state in which the rate of the use of the REC buffer is 100% continues for set monitoring time, then REC buffer Halt for clearing data stored in the REC buffer is started.

If "0x01" (transmission) is set in the Use item, a value indicative of maximum time for which an I/O request received from the host apparatus 50a is kept in a wait state at the time of the rate of the use of the REC buffer becoming 100% is set in the Halt Wait Timer item. If there is no unused buffer after the elapse of set time, then the REC buffer Halt is started. For example, if an I/O request is kept in a wait state for five seconds, then "0x01" is set. If an I/O request is kept in a wait state for ten seconds, then "0x02" is set. A Halt wait timer can be set to any value.

A value indicative of whether or not the REC buffer is a relay REC buffer is set in the Relay Function item. If REC is performed via the storage apparatus 100, then "0x01" which indicates that the REC buffer is a relay REC buffer (valid) is set. If REC consistency in which the order of remote copy is guaranteed is performed between the storage apparatus 200 and 300 without the storage apparatus 100, then "0x00" which indicates that the REC buffer is not a relay REC buffer (invalid) is set.

FIG. 7 is a view for describing an example of setting a combination of REC buffers.

Combinations of REC buffers are indicated on the upper part of FIG. 7 and a plurality of REC buffer management tables 240a for setting the combinations of REC buffers indicated on the upper part of FIG. 7 are indicated on the lower part of FIG. 7. In an item of a REC buffer management table 240a of FIG. 7 in which an arbitrary value is set, a specific value is not stated and only the word "arbitrary" is written. Furthermore, on account of space consideration, ID of the storage apparatus 200, 100, and 300 is "A", "B", and "C" respectively. In addition, "open" and "mainframe" in the Type item are abbreviated to "O" and "M" respectively.

A REC buffer which functions as a relay REC buffer meets the following (condition 1), (condition 2), and (condition 3). (condition 1): there is a REC buffer for which the Use item is "receiving" and for which the Relay Function item is "valid". (condition 2): there is a REC buffer for which the Use item is "transmission" and for which the Relay Function item is "valid". (condition 3): the Type item for a REC buffer which meets the above (condition 1) is the same as the Type item for a REC buffer which meets the above (condition 2).

In the REC buffer management table 240a in the first line indicated in FIG. 7, the Type item is set to "open", the Use item is set to "transmission", and the Relay Function item is set to "valid". Furthermore, in the REC buffer management table 240a in the second line indicated in FIG. 7, the Type item is set to "open", the Use item is set to "receiving", and the Relay Function item is set to "valid". Accordingly, setting is performed so that REC object data stored in a REC buffer group in the storage apparatus 200 REC buffer group ID of which is "#00" will be stored in a REC buffer group in the storage apparatus 100 REC buffer group ID of which is "#00".

In the REC buffer management table 240a indicated in the third line, the Type item is set to "open", the Use item is set to "transmission", and the Relay Function item is set to "valid". Furthermore, in the REC buffer management table 240a indicated in the fourth line, the Type item is set to "open", the Use item is set to "receiving", and the Relay Function item is set to "valid". Accordingly, setting is performed so that REC object data stored in a REC buffer group in the storage apparatus 100 REC buffer group ID of which is "#01" will be stored in a REC buffer group in the storage apparatus 300 REC buffer group ID of which is "#00".

The REC buffer management table 240a indicated in the second line meets the above (condition 1). In addition, the REC buffer management table 240a indicated in the third line meets the above (condition 2). Moreover, the REC buffer management table 240a indicated in the second line and the REC buffer management table 240a indicated in the third line meet the above (condition 3). This indicates that the REC buffer group in the storage apparatus 100 the REC buffer group ID of which is "#00" and the REC buffer group in the storage apparatus 100 the REC buffer group ID of which is "#01" are associated with each other.

In the REC buffer management table 240a indicated in the fifth line, the Type item is set to "open", the Use item is set to "transmission", and the Relay Function item is set to "invalid". Furthermore, in the REC buffer management table 240a indicated in the sixth line, the Type item is set to "open", the Use item is set to "receiving", and the Relay Function item is set to "invalid". Accordingly, setting is performed so that data stored in a REC buffer group in the storage apparatus 200 REC buffer group ID of which is "#01" will be stored in a REC buffer group in the storage apparatus 100 REC buffer group ID of which is "#02". The REC buffer management table 240a indicated in the fifth line does not meet the above (condition 1) and the REC buffer management table 240a indicated in the sixth line does not meet the above (condition 2). This indicates that a process is completed between the storage apparatus 200 and 100.

In the REC buffer management table 240a indicated in the seventh line, the Type item is set to "mainframe", the Use item is set to "transmission", and the Relay Function item is set to "invalid". Furthermore, in the REC buffer management table 240a indicated in the eighth line, the Type item is set to "mainframe", the Use item is set to "receiving", and the Relay Function item is set to "invalid". Accordingly, setting is performed so that data stored in a REC buffer group in the storage apparatus 100 REC buffer group ID of which is "#03" will be stored in a REC buffer group in the storage apparatus 300 REC buffer group ID of which is "#01". The REC buffer management table 240a indicated in the seventh line does not meet the above (condition 1) and the REC buffer management table 240a indicated in the eighth line does not meet the above (condition 2). This indicates that a process is completed between the storage apparatus 100 and 300.

The functions of the controller module 10a will now be described. The controller module 10a includes a command processing section 110, a REC buffer management data storage section 120, a buffer identify data storage section 130, a copy control section 140, a buffer set data storage section 150, and a buffer group 160. The buffer identify data storage section 130 is an example of the management information storage section. The copy control section 140 is an example of the information processing section and the transmission section. The buffer set data storage section 150 is an example of the area ID storage section.

The command processing section 110 adds the ID of the storage apparatus 100 and data indicative of relay REC operation to a command parameter received from the storage apparatus 200.

The REC buffer management data storage section 120 stores buffer management data set by an operator via the management apparatus (not illustrated).

The buffer identify data storage section 130 stores an address of a buffer in the buffer group 160 which stores REC object data and buffer identify data including attribute data regarding REC object data which is to be stored in a buffer, according to buffers.

When the copy control section 140 receives a buffer set transmit command from the storage apparatus 200, the copy control section 140 makes a search for a relay transmit REC buffer. If the copy control section 140 finds a relay transmit REC buffer, then the copy control section 140 determines that the storage apparatus 100 is a relay apparatus, and performs a process. If the copy control section 140 does not find a relay transmit REC buffer, then the copy control section 140 determines that the storage apparatus 100 is an end apparatus which is a data copy destination, and copies REC object data by the use of a REC session established between the storage apparatus 100 and 200.

The copy control section 140 includes a buffer set reservation unit 141 and an address swap unit 142.

When the buffer set reservation unit 141 receives buffer set data including data items stored in a buffer set table described later, the buffer set reservation unit 141 determines whether or not the storage apparatus 100 performs a process as a relay apparatus. When the buffer set reservation unit 141 determines that the storage apparatus 100 performs a process as a relay apparatus, the buffer set reservation unit 141 receives the buffer set data. When the buffer set reservation unit 141 receives the buffer set data, the buffer set reservation unit 141 stores the received buffer set data in the buffer set data storage section 150. The buffer set reservation unit 141 then reserves a relay receive REC buffer and a relay transmit REC buffer. When the buffer set reservation unit 141 reserves the relay receive REC buffer and the relay transmit REC buffer, the buffer set reservation unit 141 returns to the storage apparatus 200 a response to the effect that the buffer set reservation unit 141 reserves the relay receive REC buffer and the relay transmit REC buffer. In response to this response, the storage apparatus 200 transmits REC object data and buffer identify data of the relay receive REC buffer and the relay transmit REC buffer. The buffer set reservation unit 141 stores the received REC object data in the relay receive REC buffer. In addition, the buffer set reservation unit 141 stores the received buffer identify data of the relay receive REC buffer and the relay transmit REC buffer in the buffer identify data storage section 130.

FIG. 8 is a view for describing buffer identify data.

Buffer identify data is stored in a table. As stated above, buffer identify data is stored according to REC buffers, so one buffer identify table 130a is constructed for one REC buffer.

The buffer identify table 130a includes State, Buffer ID, Size, Number of Pieces of Data Stored, Buffer Address, and Attribute Data items.

A value indicative of a state of a REC buffer (hereinafter referred to as the "corresponding REC buffer") managed by the buffer identify table 130a is set in the State item. A state is an initial state "0x00", storing "0x01", stored "0x02", or the like.

ID of the corresponding REC buffer is set in the Buffer ID item.

The size of the corresponding REC buffer is set in the Size item. In this embodiment the fixed value "0x08" is set. "0x08" indicates that the size of the corresponding REC buffer is 8 MB.

The number of pieces of REC object data stored in the corresponding REC buffer is set in the Number of Pieces of Data Stored item.

A leading address of the corresponding REC buffer is set in the Buffer Address item.

Attribute data for each piece of REC object data stored is set in the Attribute Data item. Attribute data for a piece of REC object data includes a session management table number, a copy source volume number, a copy destination volume number, a copy source volume start LBA, a copy destination volume start LBA, and block size.

Of data set in the buffer identify table 130a, data transferred to the storage apparatus 300 is attribute data.

The address swap unit 142 has the function of exchanging a buffer address included in the buffer identify table 130a for the relay receive REC buffer for a buffer address included in the buffer identify table 130a for the relay transmit REC buffer.

The buffer set data storage section 150 stores the buffer set data regarding the relay receive REC buffer and the relay transmit REC buffer reserved by the buffer set reservation unit 141.

FIG. 9 is a view for describing buffer set data.

Buffer set data is stored in a table.

A buffer set table 150a includes Buffer Set Table ID, Buffer ID, Relay Transmission Group ID, and Relay Transmission Buffer Set Table ID items. Of these items, buffer set table ID and buffer ID are included in the buffer set data received from the storage apparatus 200.

ID for identifying the buffer set table 150a is set in the Buffer Set Table ID item.

ID (buffer ID) of buffers included in a buffer set about which the storage apparatus 200 informs the storage apparatus 100 is set in the Buffer ID item. In the example of FIG. 9, ID of buffers included in a buffer set in each of the two controller modules 10a and 10b is set. When transfer is performed, ID of a transfer source buffer and ID of a transfer destination buffer are set as a pair and the storage apparatus 200 informs the storage apparatus 100 about the ID of the transfer destination buffer as a buffer ID group of the buffers included in the buffer set.

If the buffer set is a relay receive REC buffer set and there is a relay transmit REC buffer in the storage apparatus 100, ID of a REC buffer group reserved by the buffer set reservation unit 141 is set in the Relay Transmit Group ID item.

If relay transmit group ID is set, ID of a buffer set table for the relay transmit group reserved simultaneously with the relay receive REC buffer set is set in the Relay Transmit Buffer Set Table ID item.

Of data set in the buffer set table 150a, data transferred to the storage apparatus 300 is set in the Buffer ID item.

A process performed by the use of the relay REC buffer according to this embodiment in the storage system 1000 will now be described.

Figure 10:
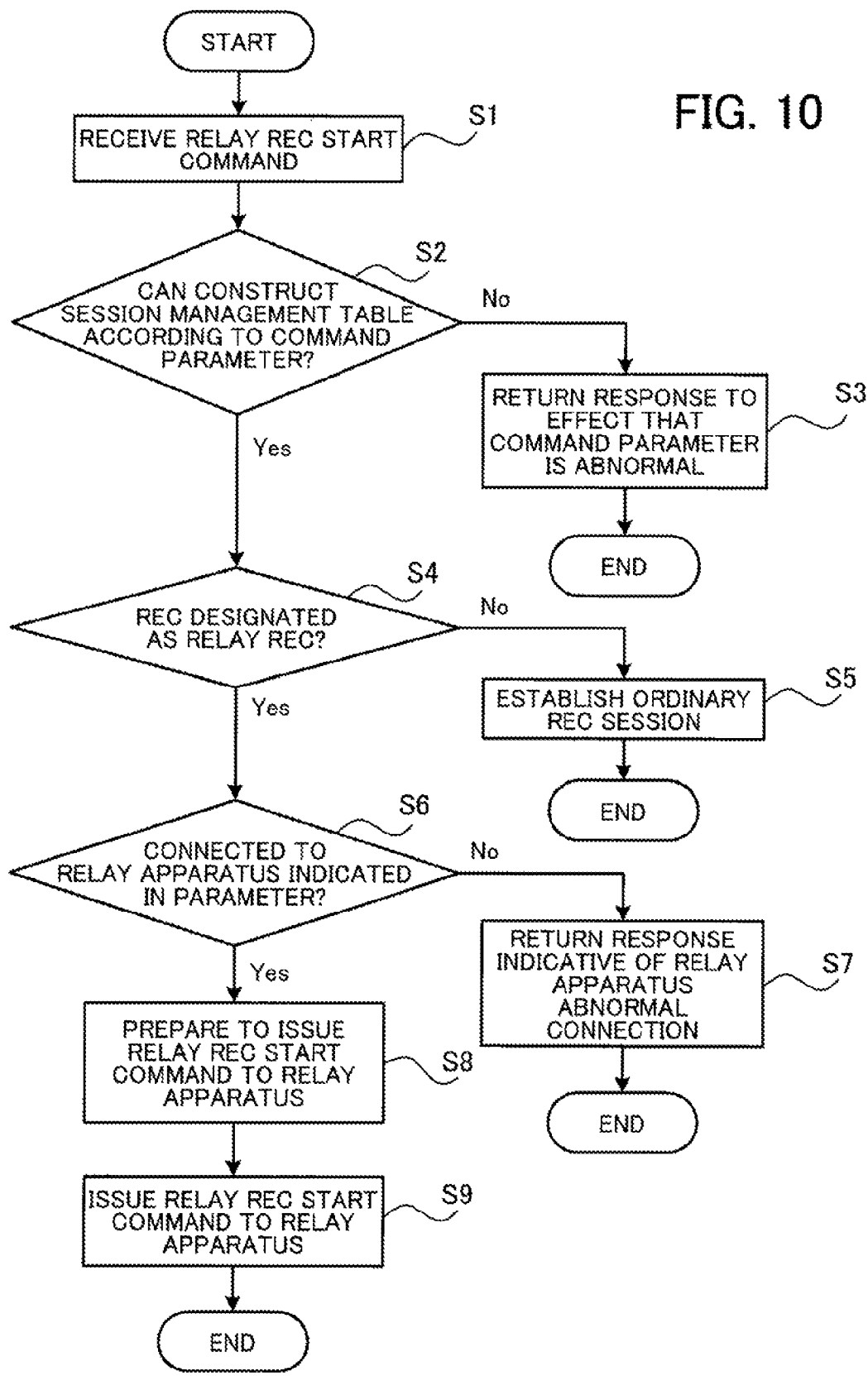
FIG. 10 is a flow chart of session command processing performed by a copy source apparatus.

FIG. 10 is a flow chart of session command processing performed by a copy source apparatus.

(Step S1) When the command processing section 210 receives a relay REC start command, the command processing section 210 proceeds to step S2.

(Step S2) The command processing section 210 compares a command parameter 210a included in the relay REC start command with data indicative of the configuration of the storage apparatus 200, and determines whether or not the command processing section 210 can construct a session management table according to the command parameter 210a. If the command processing section 210 can construct a session management table according to the command parameter 210a ("yes" in step S2), then the command processing section 210 proceeds to step S4. If the command processing section 210 cannot construct a session management table according to the command parameter 210a ("no" in step S2), then the command processing section 210 proceeds to step S3.

(Step S3) The command processing section 210 returns to the host apparatus 50a a response to the effect that the command parameter 210a included in the relay REC start command is abnormal. After that, the command processing section 210 terminates the process indicated in FIG. 10.

(Step S4) The command processing section 210 refers to a REC operation mode flag included in the command parameter 210a, and determines whether or not the REC is designates as relay REC. If the REC is designates as relay REC ("yes" in step S4), then the command processing section 210 proceeds to step S6. If the REC is not designates as relay REC ("no" in step S4), then the command processing section 210 proceeds to step S5.

(Step S5) The command processing section 210 establishes a REC session with the storage apparatus 300 in which the storage apparatus 100 is not used. Descriptions of a REC session in which the storage apparatus 100 is not used will be omitted. After that, the command processing section 210 terminates the process indicated in FIG. 10.

(Step S6) The command processing section 210 refers to relay apparatus ID included in the command parameter 210a and data indicative of the connection of the storage apparatus 200, and determines whether or not the storage apparatus 200 is connected to a relay apparatus (that is to say, the storage apparatus 100). If the storage apparatus 200 is connected to the storage apparatus 100 ("yes" in step S6), then the command processing section 210 proceeds to step S8. If the storage apparatus 200 is not connected to the storage apparatus 100 ("no" in step S6), then the command processing section 210 proceeds to step S7.

(Step S7) The command processing section 210 returns a response indicative of relay apparatus abnormal connection to the host apparatus 50a. After that, the command processing section 210 terminates the process indicated in FIG. 10.

(Step S8) The command processing section 210 prepares to issue a relay REC start command to the storage apparatus 100. When the preparation for issuing a relay REC start command to the storage apparatus 100 is completed, the command processing section 210 proceeds to step S9.

(Step S9) The command processing section 210 issues a relay REC start command to the storage apparatus 100. After that, the command processing section 210 terminates the process indicated in FIG. 10.

Figure 11:
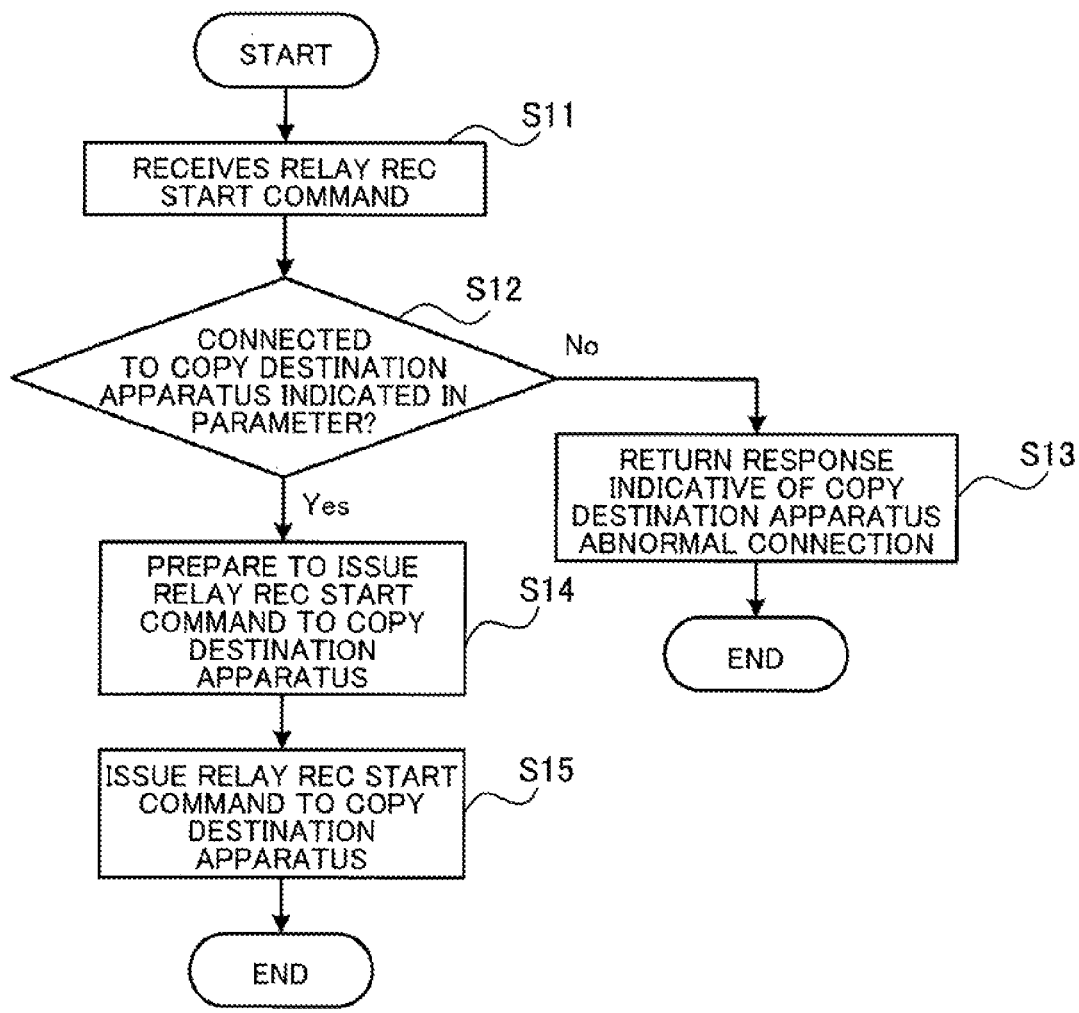
FIG. 11 is a flow chart of session command processing performed by a relay apparatus.

FIG. 11 is a flow chart of session command processing performed by the relay apparatus.

(Step S11) When the command processing section 110 receives the relay REC start command from the storage apparatus 200, the command processing section 110 proceeds to step S12.

(Step S12) The command processing section 110 refers to copy destination apparatus ID included in a command parameter 210a included in the relay REC start command, and determines whether or not the storage apparatus 100 is connected to the storage apparatus 300. If the storage apparatus 100 is connected to the storage apparatus 300 ("yes" in step S12), then the command processing section 110 proceeds to step S14. If the storage apparatus 100 is not connected to the storage apparatus 300 ("no" in step S12), then the command processing section 110 proceeds to step S13.

(Step S13) The command processing section 110 returns a response indicative of copy destination apparatus abnormal connection to the storage apparatus 200. After that, the command processing section 110 terminates the process indicated in FIG. 11.

(Step S14) The command processing section 110 prepares to issue a relay REC start command to the storage apparatus 300. When the preparation for issuing a relay REC start command to the storage apparatus 300 is completed, the command processing section 110 proceeds to step S15.

(Step S15) The command processing section 110 issues a relay REC start command to the storage apparatus 300. After that, the command processing section 110 terminates the process indicated in FIG. 11.

Figure 12:
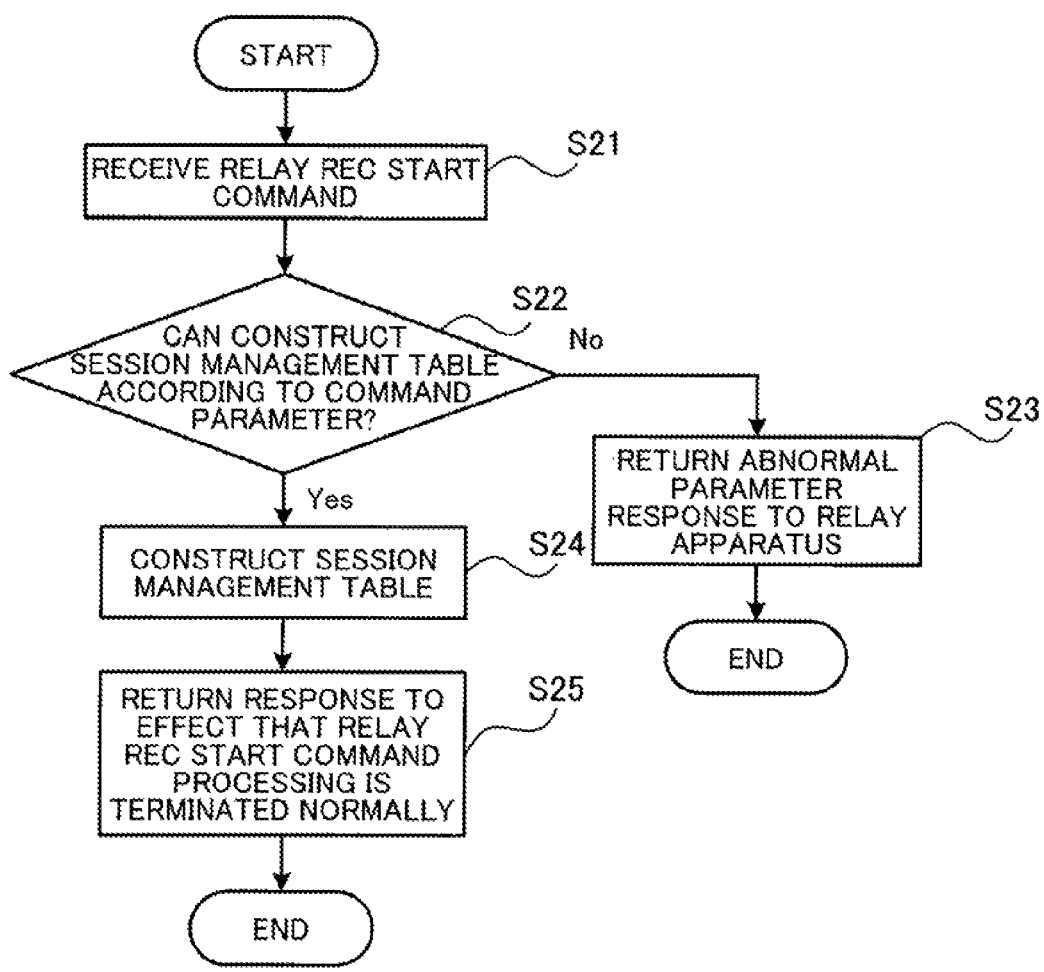
FIG. 12 is a flow chart of session command processing performed by a copy destination apparatus.

FIG. 12 is a flow chart of session command processing performed by the copy destination apparatus.

(Step S21) When the command processing section 310 receives the relay REC start command, the command processing section 310 proceeds to step S22.

(Step S22) The command processing section 310 compares a command parameter 210a included in the relay REC start command with data indicative of the configuration of the storage apparatus 300, and determines whether or not the command processing section 310 can construct a session management table 320a according to the command parameter 210a. The structure of the session management table 320a is the same as that of the session management table 220a. If the command processing section 310 determines that the command processing section 310 can construct a session management table 320a according to the command parameter 210a ("yes" in step S22), then the command processing section 310 proceeds to step S24. If the command processing section 310 determines that the command processing section 310 cannot construct a session management table 320a according to the command parameter 210a ("no" in step S22), then the command processing section 310 proceeds to step S23.

(Step S23) The command processing section 310 returns an abnormal parameter response to the storage apparatus 100. After that, the command processing section 310 terminates the process indicated in FIG. 12.

(Step S24) The command processing section 310 constructs the session management table 320a by the use of the parameter included in the relay REC start command. The command processing section 310 stores the constructed session management table 320a in the session management data storage section 320. After that, the command processing section 310 proceeds to step S25.

(Step S25) The command processing section 310 returns to the storage apparatus 100 a response to the effect that relay REC start command processing is terminated normally. After that, the command processing section 310 terminates the process indicated in FIG. 12.

Figure 13:
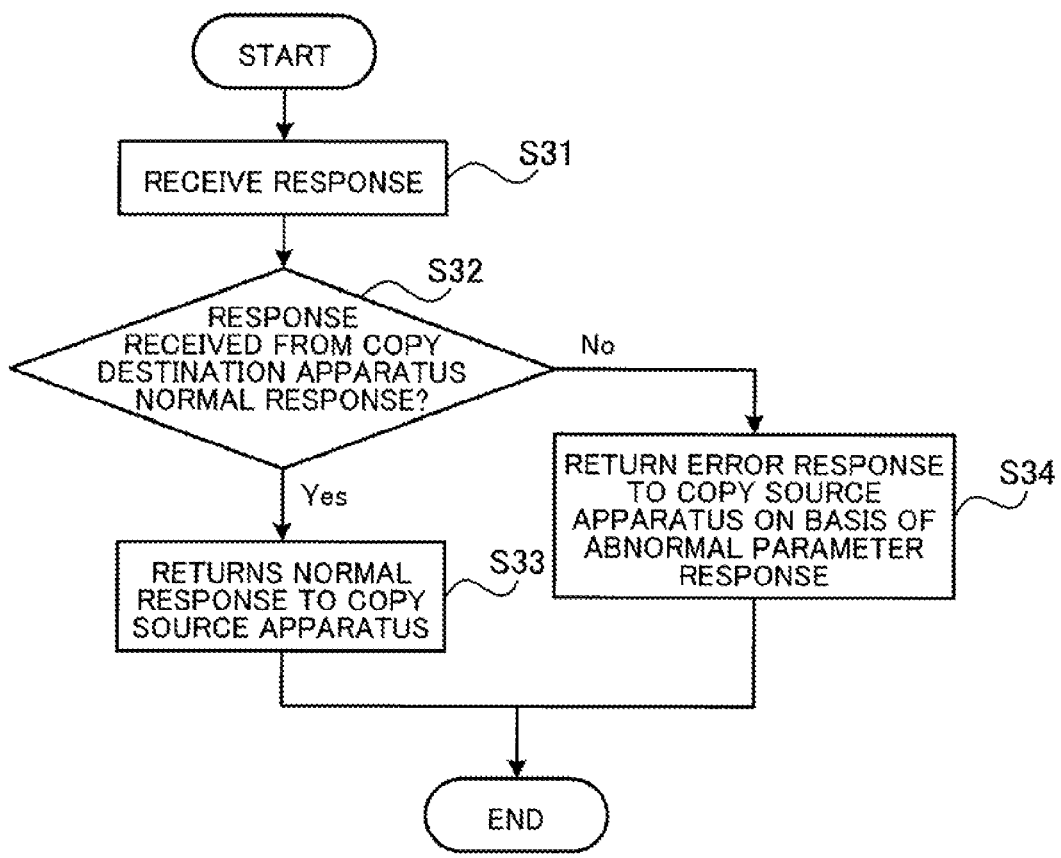
FIG. 13 is a flow chart of session command processing performed by the relay apparatus.

FIG. 13 is a flow chart of session command processing performed by the relay apparatus.

(Step S31) When the command processing section 110 receives a response from the storage apparatus 300, the command processing section 110 proceeds to step S32.

(Step S32) The command processing section 110 determines whether or not the response received from the storage apparatus 300 is a normal response. If the response received from the storage apparatus 300 is a normal response ("yes" in step S32), then the command processing section 110 proceeds to step S33. If the response received from the storage apparatus 300 is not a normal response ("no" in step S32), then the command processing section 110 proceeds to step S34.

(Step S33) The command processing section 110 returns a normal response to the storage apparatus 200. After that, the command processing section 110 terminates the process indicated in FIG. 13.

(Step S34) The command processing section 110 returns an error response to the storage apparatus 200 on the basis of an abnormal parameter response received from the storage apparatus 300. After that, the command processing section 110 terminates the process indicated in FIG. 13.

Figure 14:
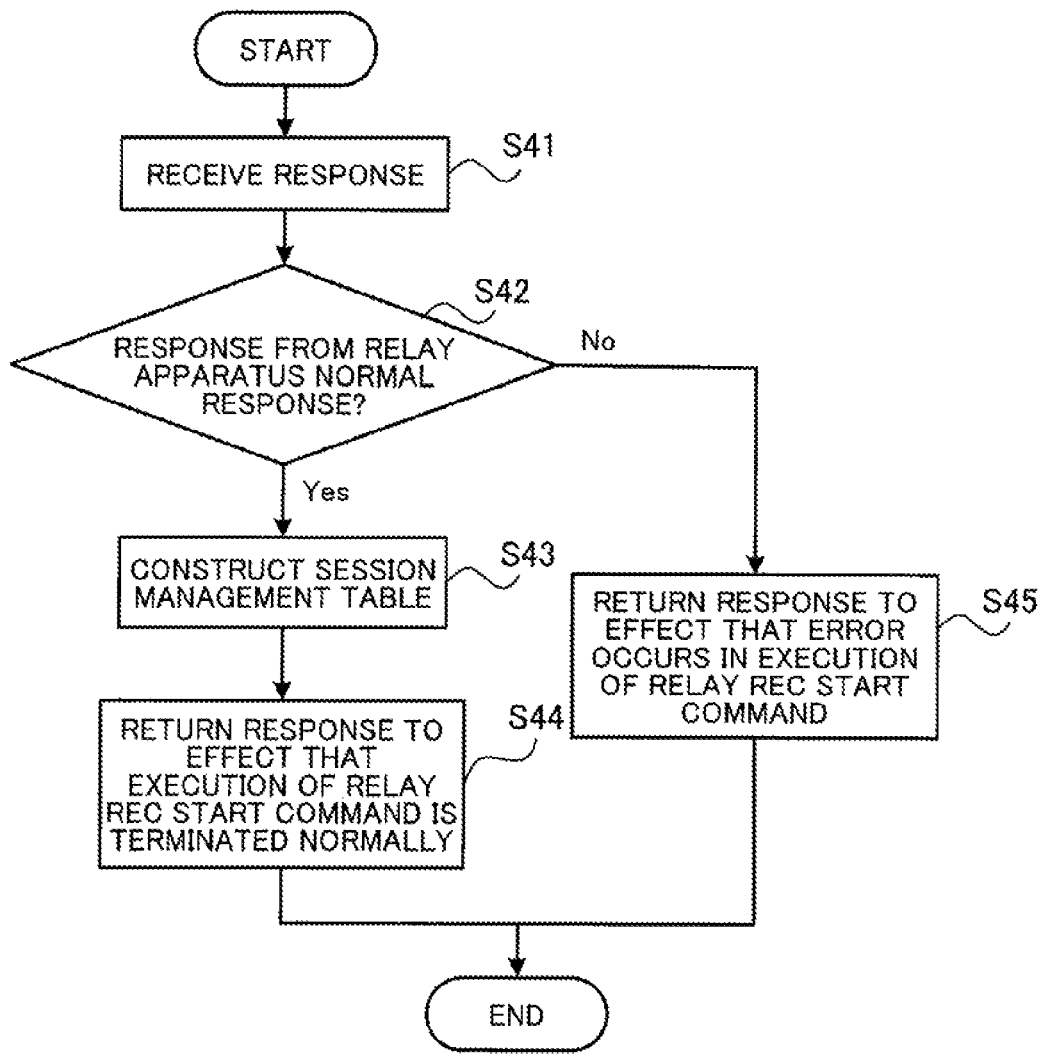
FIG. 14 is a flow chart of session command processing performed by the copy source apparatus.

FIG. 14 is a flow chart of session command processing performed by the copy source apparatus.

(Step S41) When the command processing section 210 receives a response from the storage apparatus 100, the command processing section 210 proceeds to step S42.

(Step S42) The command processing section 210 determines whether or not the response received from the storage apparatus 100 is a normal response. If the response received from the storage apparatus 100 is a normal response ("yes" in step S42), then the command processing section 210 proceeds to step S43. If the response received from the storage apparatus 300 is an error response ("no" in step S42), then the command processing section 210 proceeds to step S45.

(Step S43) The command processing section 210 constructs a session management table 220a. The contents of the session management table 220a are the same as those of the session management table 320a. The command processing section 210 stores the constructed session management table 220a in the session management data storage section 220. After that, the command processing section 210 proceeds to step S44.

(Step S44) The command processing section 210 returns to the host apparatus 50a a response to the effect that the execution of the relay REC start command is terminated normally. After that, the command processing section 210 terminates the process indicated in FIG. 14.

(Step S45) The command processing section 210 returns to the host apparatus 50a a response to the effect that an error occurs in the execution of the relay REC start command. After that, the command processing section 210 terminates the process indicated in FIG. 14.

An initial copy process performed by the use of relay REC will now be described.

Figure 15:
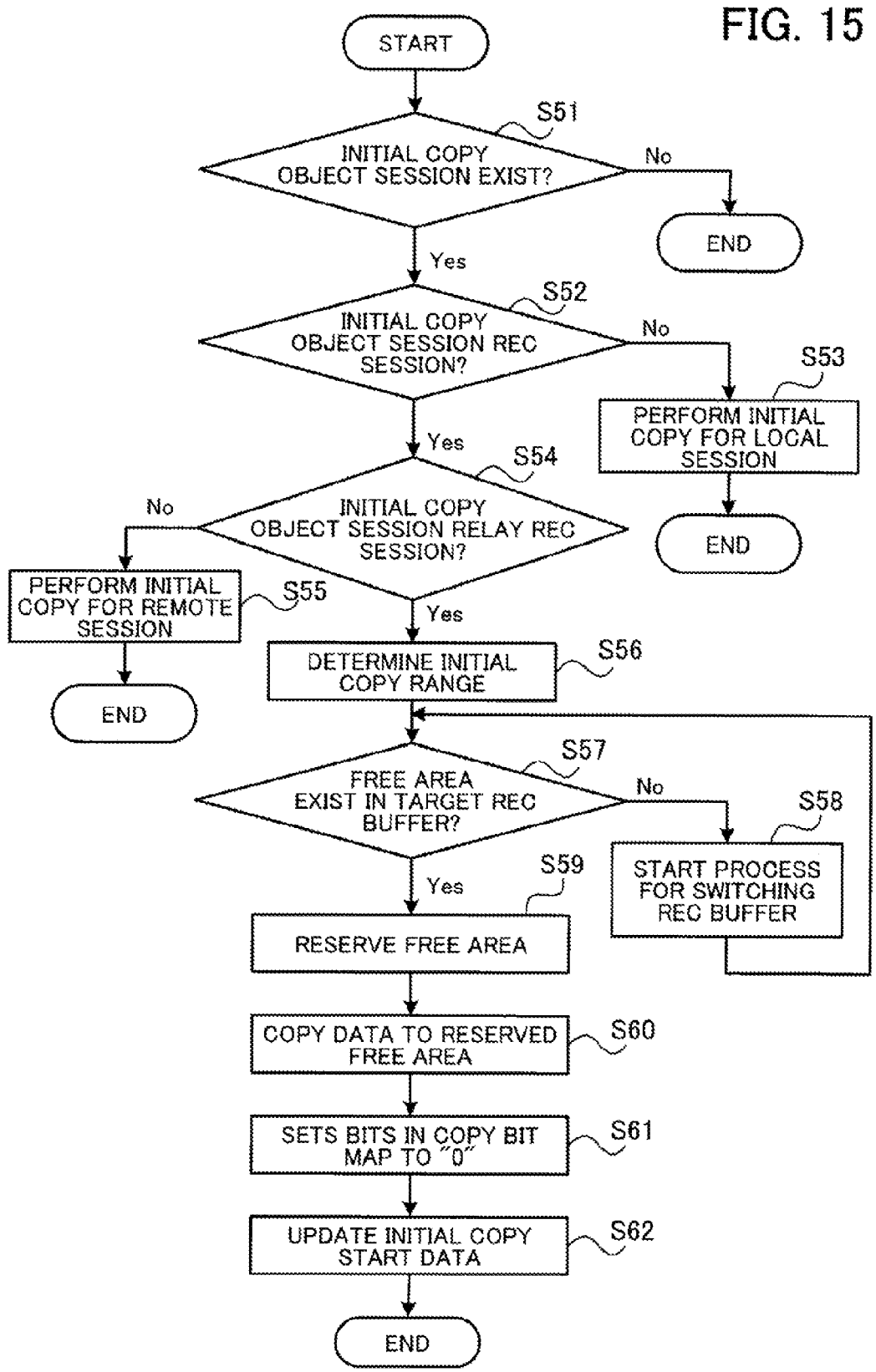
FIG. 15 is a flow chart of an initial copy process performed by the use of relay REC.

FIG. 15 is a flow chart of an initial copy process performed by the use of relay REC.

(Step S51) The copy control section 250 makes a search for an initial copy object session. If the copy control section 250 can find a session which requires initial copy ("yes" in step S51), then the copy control section 250 proceeds to step S52. If the copy control section 250 cannot find a session which requires initial copy ("no" in step S51), then the copy control section 250 terminates the process indicated in FIG. 15.

(Step S52) The copy control section 250 refers to copy destination session ID in a session management table 220a and determines whether or not the initial copy object session is a REC session. If the initial copy object session is a REC session ("yes" in step S52), then the copy control section 250 proceeds to step S54. If the initial copy object session is not a REC session ("no" in step S52), then the copy control section 250 proceeds to step S53.

(Step S53) The copy control section 250 performs initial copy for a local session (between logical volumes in the storage apparatus 200). After that, the copy control section 250 terminates the process indicated in FIG. 15.

(Step S54) The copy control section 250 refers to a REC operation mode flag in the session management table 220a and determines whether or not the initial copy object session (REC session) is a relay REC session. If the initial copy object session is a relay REC session ("yes" in step S54), then the copy control section 250 proceeds to step S56. If the initial copy object session is not a relay REC session ("no" in step S54), then the copy control section 250 proceeds to step S55.

(Step S55) The copy control section 250 performs initial copy for the REC session between the storage apparatus 200 and 300 in which the storage apparatus 100 is not used. After that, the copy control section 250 terminates the process indicated in FIG. 15.

(Step S56) The copy control section 250 refers to initial copy start data and determines an initial copy range. After that, the copy control section 250 proceeds to step S57.

(Step S57) The copy control section 250 determines whether or not there is a free area in a target REC buffer. If there is a free area in the target REC buffer ("yes" in step S57), then the copy control section 250 proceeds to step S59. If there is no free area in the target REC buffer ("no" in step S57), then the copy control section 250 proceeds to step S58.

(Step S58) The copy control section 250 starts a process for switching the REC buffer. After that, the copy control section 250 proceeds to step S57.

(Step S59) The copy control section 250 reserves a free area. After that, the copy control section 250 proceeds to step S60.

(Step S60) The copy control section 250 writes data within the range determined in step S56 to the free area reserved in step S59. After that, the copy control section 250 proceeds to step S61.

(Step S61) The copy control section 250 sets bits in a copy bit map which manages the initial copy range to "0". After that, the copy control section 250 proceeds to step S61.

(Step S61) The copy control section 250 updates the initial copy start data. After that, the copy control section 250 terminates the process indicated in FIG. 15.

Figure 16:
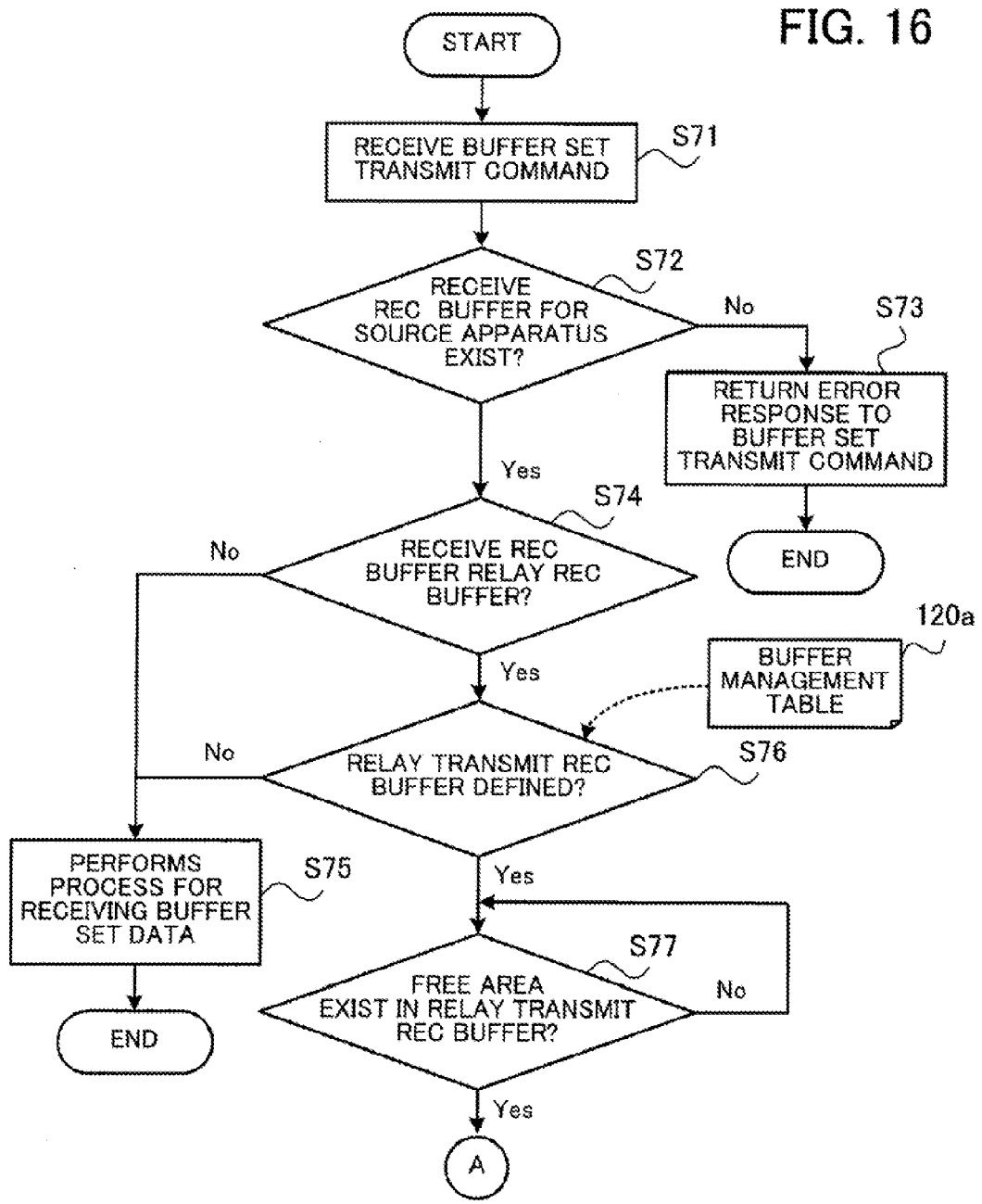
FIG. 16 is a flow chart of a buffer set receiving process in relay REC (part 1)
Figure 17:
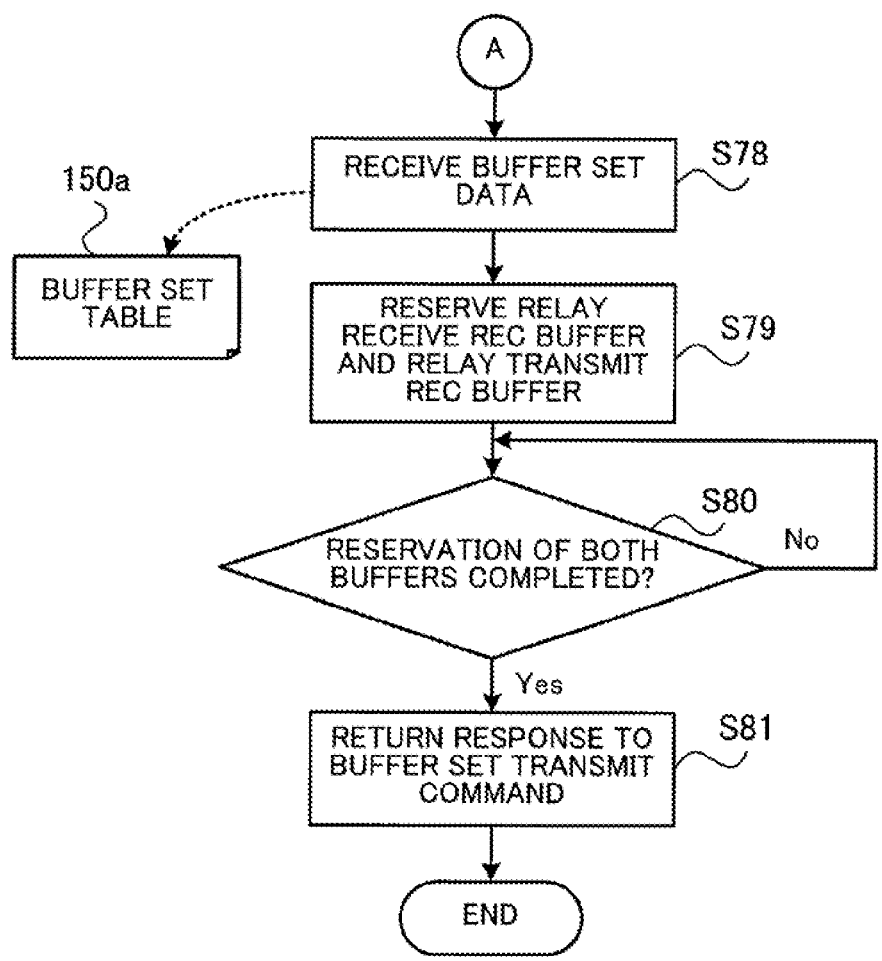
FIG. 17 is a flow chart of a buffer set receiving process in relay REC (part 2)

FIGS. 16 and 17 are flow charts of a buffer set receiving process in relay REC.

(Step S71) When the buffer set reservation unit 141 receives a buffer set transmit command from the storage apparatus 200, the buffer set reservation unit 141 proceeds to step S72.

(Step S72) The buffer set reservation unit 141 refers to a REC buffer management table (hereinafter referred to as a "REC buffer management table 120a") stored in the REC buffer management data storage section 120, and determines whether or not there is a receive REC buffer for the storage apparatus 200. To be concrete, the buffer set reservation unit 141 determines whether or not there is a REC buffer management table 120a in which the ID of the storage apparatus 200 is set in a Connection Destination Apparatus ID column and in which "receiving" is set in a Use item. If there is a receive REC buffer for the storage apparatus 200, that is to say, if there is a REC buffer management table 120a in which the ID of the storage apparatus 200 is set in a Connection Destination Apparatus ID column and in which "receiving" is set in a Use item ("yes" in step S72), then the buffer set reservation unit 141 proceeds to step S74. If there is no receive REC buffer for the storage apparatus 200, that is to say, if there is no REC buffer management table 120a in which the ID of the storage apparatus 200 is set in a Connection Destination Apparatus ID column and in which "receiving" is set in a Use item ("no" in step S72), then the buffer set reservation unit 141 proceeds to step S73.

(Step S73) The buffer set reservation unit 141 returns an error response to the buffer set transmit command to the storage apparatus 200. After that, the buffer set reservation unit 141 terminates the process indicated in FIG. 16.

(Step S74) The buffer set reservation unit 141 refers to the REC buffer management table 120a and determines whether or not the receive REC buffer for the storage apparatus 200 is a relay REC buffer. To be concrete, the buffer set reservation unit 141 determines whether or not "valid" is set in the Relay Function item of the REC buffer management table 120a for which the determination that the ID of the storage apparatus 200 is set in the Connection Destination Apparatus ID item and that "receiving" is set in the Use item is made in step S72. If the receive REC buffer for the storage apparatus 200 is a relay REC buffer, that is to say, if "valid" is set in the Relay Function item of the REC buffer management table 120a ("yes" in step S74), then the buffer set reservation unit 141 proceeds to step S76. If the receive REC buffer for the storage apparatus 200 is not a relay REC buffer, that is to say, if "valid" is not set in the Relay Function item of the REC buffer management table 120a ("no" in step S74), then the buffer set reservation unit 141 proceeds to step S75. Whether or not the above (condition 1) is met is determined in steps S72 and S74.

(Step S75) The buffer set reservation unit 141 determines that the storage apparatus 100 is a target apparatus (end apparatus) for the data transfer, and performs a process in ordinary REC consistency mode. To be concrete, the copy control section 140 performs a process for receiving buffer set data. When after that REC object data is transmitted from the storage apparatus 200, the copy control section 140 stores the transmitted REC object data in a logical volume 61*a*. After that, the copy control section 140 terminates the process indicated in FIG. 16.

(Step S76) The buffer set reservation unit 141 refers to a REC buffer management table 120*a* and determines whether or not a relay transmit REC buffer is defined. To be concrete, the buffer set reservation unit 141 determines whether or not there is a REC buffer management table 120*a* which meets the above (condition 2) and (condition 3). If a relay transmit REC buffer is defined, that is to say, if there is a REC buffer management table 120*a* which meets the above (condition 2) and (condition 3) ("yes" in step S76), then the buffer set reservation unit 141 proceeds to step S77. If a relay transmit REC buffer is not defined, that is to say, if there is no REC buffer management table 120*a* which meets the above (condition 2) and (condition 3) ("no" in step S76), then the buffer set reservation unit 141 proceeds to step S75.

(Step S77) The buffer set reservation unit 141 determines whether or not there is a free area in the relay transmit REC buffer. If there is a free area in the relay transmit REC buffer ("yes" in step S77), then the buffer set reservation unit 141 proceeds to step S78. If there is no free area in the relay transmit REC buffer ("no" in step S77), then the buffer set reservation unit 141 waits until a free area appears.

(Step S78) When the buffer set reservation unit 141 receives buffer set data, the buffer set reservation unit 141 constructs a table in which the received buffer set data is stored, and stores the table in the buffer set data storage section 150. After that, the buffer set reservation unit 141 proceeds to step S79.

(Step S79) The buffer set reservation unit 141 begins a process for reserving a relay receive REC buffer and a relay transmit REC buffer in parallel in the buffer group 160. After that, the buffer set reservation unit 141 proceeds to step S80.

(Step S80) The buffer set reservation unit 141 determines whether or not the reservation of both of the relay receive REC buffer and the relay transmit REC buffer is completed. If the reservation of both of the relay receive REC buffer and the relay transmit REC buffer is completed ("yes" in step S80), then the buffer set reservation unit 141 proceeds to step S81. If the reservation of both of the relay receive REC buffer and the relay transmit REC buffer is not completed ("no" in step S80), then the buffer set reservation unit 141 waits until the reservation of both of the relay receive REC buffer and the relay transmit REC buffer is completed.

(Step S81) The buffer set reservation unit 141 returns to the storage apparatus 200 a response to the buffer set transmit command received in step S71. After that, the buffer set reservation unit 141 terminates the process indicated in FIG. 17.

Figure 18:
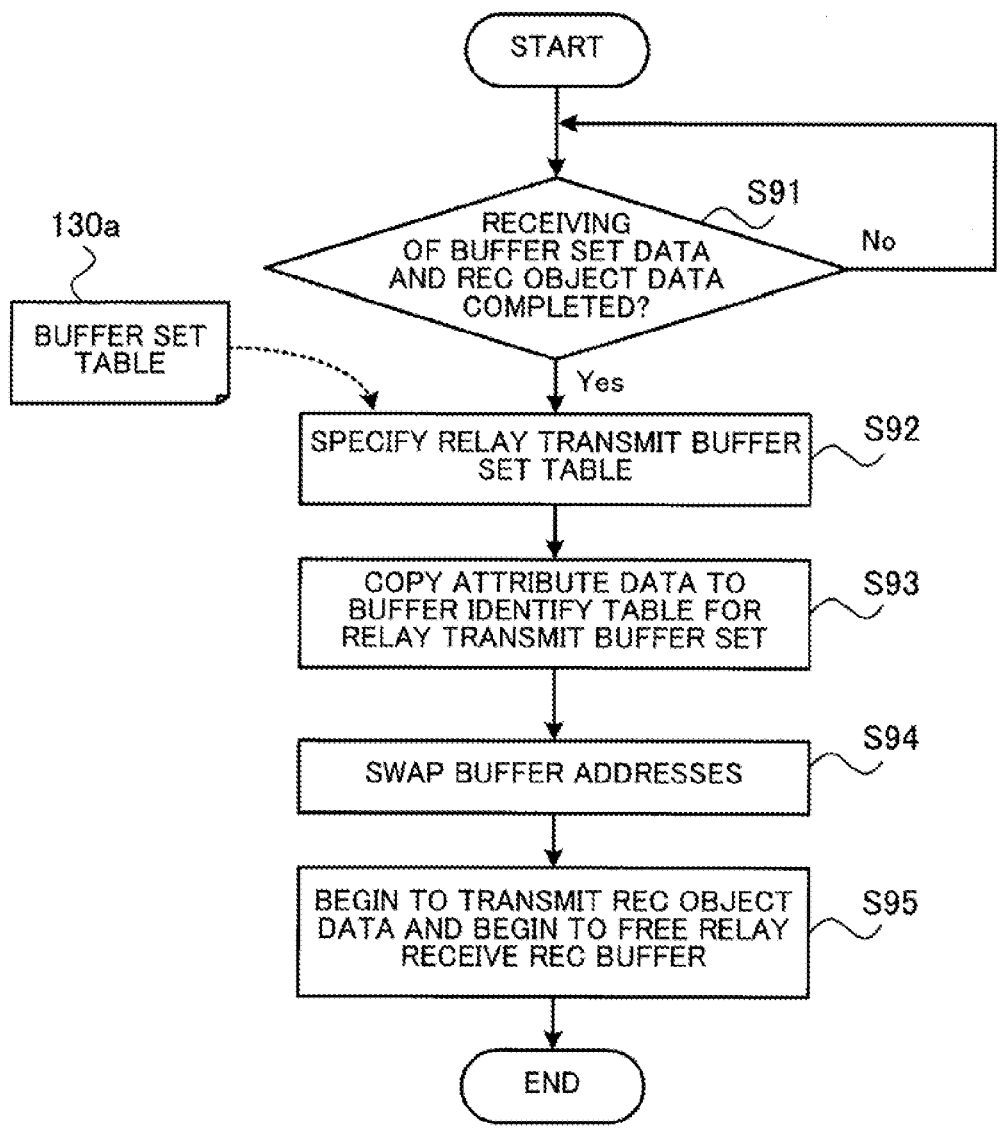
FIG. 18 is a flow chart of a process performed by an address swap unit.

FIG. 18 is a flow chart of a process performed by an address swap unit.

(Step S91) The address swap unit 142 determines whether or not the receiving of buffer set data and REC object data is completed. If the receiving of the buffer set data and the REC object data is completed ("yes" in step S91), then the address swap unit 142 proceeds to step S92. If the receiving of the buffer set data and the REC object data is not completed ("no" in step S91), then the address swap unit 142 waits until the receiving of the buffer set data and the REC object data is completed.

(Step S92) The address swap unit 142 specifies a buffer set table 150*a* in which relay transmit buffer set table ID set in the Relay Transmit Buffer Set Table ID item matches buffer set table ID set in the Buffer Set Table ID item. After that, the address swap unit 142 proceeds to step S93.

(Step S93) The address swap unit 142 specifies a buffer identify table 130*a* in which buffer ID set in the Buffer ID item of the buffer set table 150*a* specified in step S92 is set in the Buffer ID item. The address swap unit 142 then copies attribute data set in the Attribute Data item of a buffer identify table 130*a* for a relay receive REC buffer to the Attribute Data item of the specified buffer identify table 130*a*. After that, the address swap unit 142 proceeds to step S94.

(Step S94) The address swap unit 142 swaps a buffer address set in the Buffer Address item of the buffer identify table 130*a* for the relay receive REC buffer for a buffer address set in the Buffer Address item of the buffer identify table 130*a* for the relay transmit REC buffer specified in step S93. After that, the address swap unit 142 proceeds to step S95.

(Step S95) The address swap unit 142 begins to free the relay receive REC buffer of the storage apparatus 200. In addition, on the basis of the buffer identify table associated with the relay transmit REC buffer, the address swap unit 142 begins to transmit the REC object data to the storage apparatus 300. This process will be described later by giving a concrete example. After that, the address swap unit 142 terminates the process indicated in FIG. 18.

According to the process indicated in FIG. 18, the REC buffer addresses are swapped in step S94. After the REC buffer addresses are swapped, the REC buffer of the storage apparatus 200 may be freed. Accordingly, at the same time that the address swap unit 142 begins to transmit the REC object data to the storage apparatus 300, the address swap unit 142 can begin to free the REC buffer.

A concrete example of the process in step S95 for transmitting the REC object data to the storage apparatus 300 on the basis of a buffer identify table associated with the relay transmit REC buffer will now be described.

Figure 19:
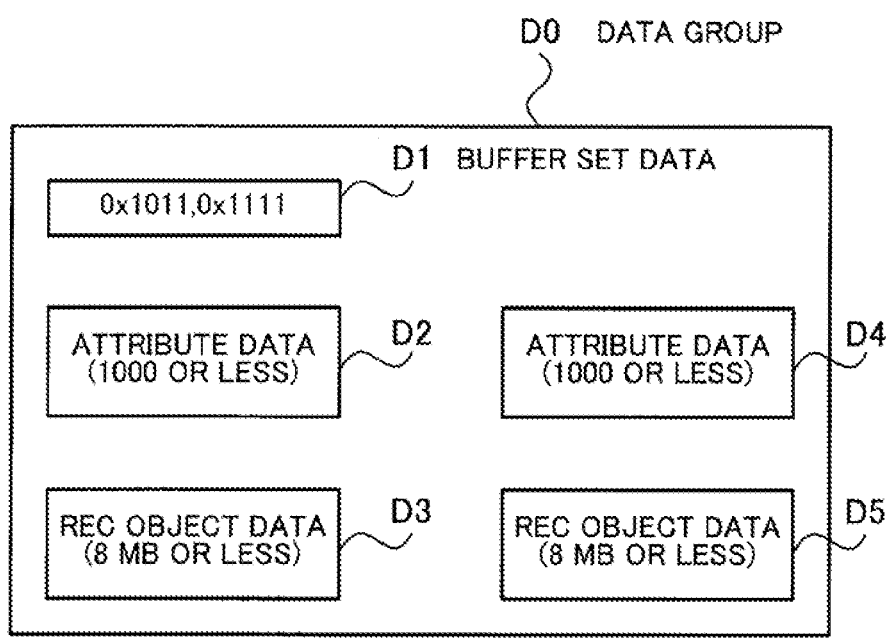
FIG. 19 is a view for describing a concrete example of a process for transmitting REC object data to a storage apparatus.
Figure 22A:
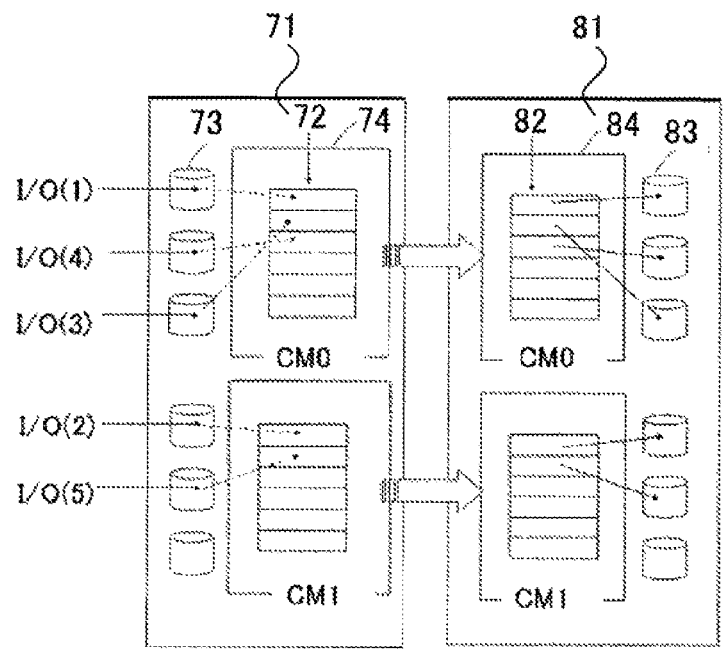
FIGS. 22A and 22B are examples of a remote copy control method by a storage apparatus.
Figure 22B:
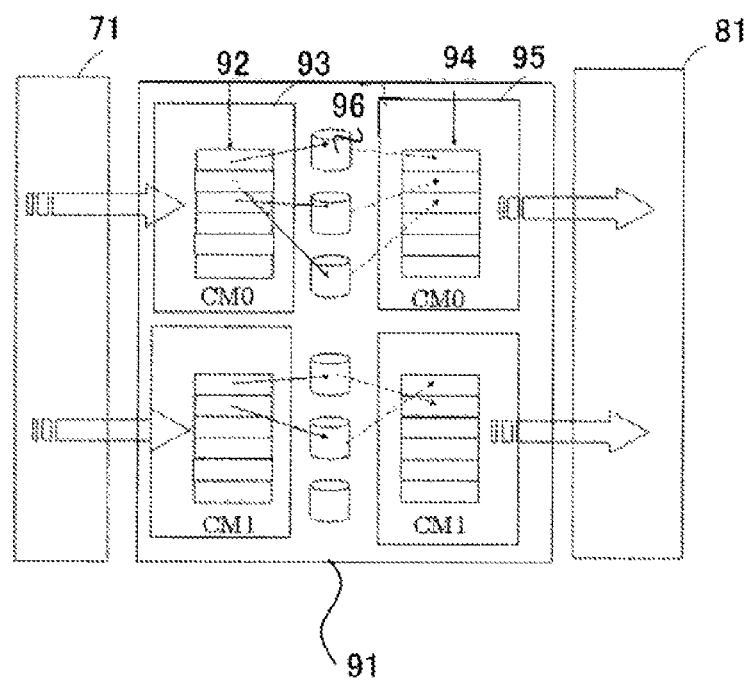

FIGS. 19 through 21 are views for describing a concrete example of a process for transmitting the REC object data to the storage apparatus.

As in the example of setting a combination of REC buffers described in FIG. 7, it is assumed that group ID of a relay receive REC buffer group for the storage apparatus 200 included in the storage apparatus 100 is #00 and that group ID of a relay transmit REC buffer group for the storage apparatus 300 included in the storage apparatus 100 is #01.

Data group D0 illustrated in FIG. 19 indicates a combination of buffer set data and REC object data transferred from the storage apparatus 200 to the storage apparatus 100.

Buffer set data D1 includes the buffer ID "0x1011" and the buffer ID "0x1111" of REC buffers included in a buffer set.

Attribute data D2 is attribute data for REC object data D3 transferred to the REC buffer the buffer ID of which is "0x1011". The number of pieces of attribute data D2 is set to 1000 or less.

The REC object data D3 is transferred to the REC buffer the buffer ID of which is "0x1011". In FIG. 19, the capacity of the REC object data D3 is set to 8 MB or less.

Attribute data D4 is attribute data for REC object data D5 transferred to the REC buffer the buffer ID of which is "0x1111". The number of pieces of attribute data D4 is set to 1000 or less.

The REC object data D5 is transferred to the REC buffer the buffer ID of which is "0x1111". In FIG. 19, the capacity of the REC object data D5 is set to 8 MB or less.

The controller module 10a illustrated in FIG. 20 holds a buffer set table 150a1 and a buffer identify table 130a1 reserved in a REC buffer group ID of which is "0x00".

The address swap unit 142 refers to the Buffer Address item of the buffer identify table 130a1 for the REC object data D3 transferred to the REC buffer the buffer ID of which is "0x1011". The address swap unit 142 then stores the REC object data D3 in a REC buffer 161a a leading address of which is "0x0000000020400000" set in the Buffer Address item.

In addition, the controller module 10a holds a buffer set table 150a2 and a buffer identify table 130a2 reserved in a REC buffer group ID of which is "0x01".

In the case of the REC consistency mode, the controller module 10a performs a process described in step S75. However, the address swap unit 142 performs a process in mode different from the REC consistency mode. That is to say, the address swap unit 142 does not store the REC object data D3 in a REC buffer 162a a leading address of which is "0x0000000080400000" set in the Buffer Address item of the buffer identify table 130a2.

The controller module 10b holds a buffer set table 150b1 and a buffer identify table 130b1 reserved in the REC buffer group the ID of which is "0x00".

An address swap unit of the controller module 10b refers to the Buffer Address item of the buffer identify table 130b1 for the REC object data D5 transferred to the REC buffer the buffer ID of which is "0x1111". The address swap unit of the controller module 10b then stores the REC object data D5 in a REC buffer 161b a leading address of which is "0x0000000020400000" set in the Buffer Address item.

The address swap unit of the controller module 10b does not store the REC object data D5 in a REC buffer 162b a leading address of which is "0x0000000080400000" set in the Buffer Address item of the buffer identify table 130b2. This is the same with the address swap unit 142.

After the reservation of a buffer set by the buffer set reservation unit 141 is completed and the REC object data is received from the storage apparatus 200, the address swap unit 142 swaps "0x0000000020400000" set in the Buffer Address item of the buffer identify table 130a1 for "0x0000000080400000" set in the Buffer Address item of the buffer identify table 130a2, as indicated in FIG. 21. In addition, the address swap unit 142 copies attribute data stored in the buffer identify table 130a1 to the buffer identify table 130a2 in its original condition.

In addition, the address swap unit of the controller module 10b swaps "0x0000000020400000" set in the Buffer Address item of the buffer identify table 130b1 for "0x0000000080400000" set in the Buffer Address item of the buffer identify table 130b2. In addition, the address swap unit of the controller module 10b copies attribute data stored in the buffer identify table 130b1 to the buffer identify table 130b2 in its original condition.

When the address swapping and the copying of the attribute data stored in the buffer identify table 130a1 are completed, the copy control section 140 performs a memory freeing process regarding the REC buffer group the ID of which is "0x00". To be concrete, the copy control section 140 deletes the buffer set table 150a1 and the buffer identify table 130a1 and frees the REC buffer 162a. In addition, the copy control section 140 refers to the Buffer Address and Attribute Data items of the buffer identify table 130a2 and begins a process for transmitting to the storage apparatus 300 REC object data stored in a REC buffer a leading address of which is "0x0000000020400000" set in the Buffer Address item and attribute data.

Furthermore, when the address swapping and the copying of the attribute data stored in the buffer identify table 130b1 are completed, a copy control section of the controller module 10b performs a memory freeing process regarding the REC buffer group the ID of which is "0x00". To be concrete, the copy control section of the controller module 10b deletes the buffer set table 150b1 and the buffer identify table 130b1 and frees the REC buffer 162b. In addition, the copy control section of the controller module 10b refers to the Buffer Address and Attribute Data items of the buffer identify table 130b2 and begins a process for transmitting to the storage apparatus 300 REC object data stored in the REC buffer the leading address of which is "0x0000000020400000" set in the Buffer Address item and attribute data.

As has been described in the foregoing, the storage apparatus 100 can transmit REC object data received from the storage apparatus 200 to the storage apparatus 300 in a state in which it stores the REC object data in a relay receive REC buffer. Accordingly, when the receiving of the REC object data ends, transmission of the REC object data to the storage apparatus 300 is begun immediately. By doing so, the order in which the REC object data is transferred can be guaranteed.

Furthermore, when the REC object data is transferred, the logical volume 61a is not used. This saves the trouble of storing the REC object data in the logical volume 61a.

The relay apparatus and the relay method according to the present invention have been described on the basis of the embodiments illustrated. However, the present invention is not limited to these embodiments. The structure of each section can be replaced with any structure having the same function. Furthermore, any other component or step may be added to the present invention.

In addition, the present invention may be a combination of the structures (characteristics) of the above two embodiments.

The above processing functions can be realized with a computer. In this case, a program in which the contents of the processing functions the relay apparatus 1 and the controller modules 10a and 10b have are described is provided. By executing this program on the computer, the above processing functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive, a flexible disk (FD), a magnetic tape, or the like. An optical disk can be a DVD, a DVD-RAM, a CD-ROM/RW, or the like. A magneto-optical recording medium can be a magneto-optical disk (MO) or the like.

To place the program on the market, portable record media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable record medium, which is transferred from the server computer, or the like, on its hard disk. The computer then reads the program from its hard disk and performs processes in compliance with the program. The computer can also read the program directly from a portable record medium and perform processes in compliance with the program. Furthermore, each time the program is transferred from the server computer connected via a network, the computer can perform processes in turn in compliance with the program it receives.

In addition, at least a part of above processing functions can be realized by an electronic circuit such as a digital signal processor (DSP), an application specific integrated circuit (ASIC), or a programmable logic device (PLD).

It is possible to transfer data stored in a first storage area to a second apparatus without shifting it to a second storage area.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A relay apparatus for relaying data transmitted from a first apparatus to a second apparatus, the relay apparatus comprising:
    a relay receive buffer which stores data transmitted from the first apparatus;
    a relay transmit buffer which corresponds to the relay receive buffer and stores data to be transmitted to the second apparatus;
    a management information storage section which stores first management information for managing an address of the relay receive buffer and second management information for managing an address of the relay transmit buffer;
    an information processing section which stores, when receiving data directed to the second apparatus from the first apparatus, the received data in the relay receive buffer, and swaps the address of the relay receive buffer managed by the first management information for the address of the relay transmit buffer managed by the second management information; and
    a transmission section which transmits to the second apparatus data stored at the address of the relay transmit buffer managed by the second management information.

2. The relay apparatus according to claim 1, wherein:
    the first management information includes attribute information for identifying a copy source area and a copy destination area for the data;
    when the information processing section swaps the address of the relay receive buffer for the address of the relay transmit buffer, the information processing section sets the attribute information in the second management information; and
    when the transmission section transmits the data to the second apparatus, the transmission section also transmits attribute information for the data to the second apparatus.

3. The relay apparatus according to claim 1 further comprising a relationship information storage section which stores relationship information by which the address of the relay receive buffer is associated with the address of the relay transmit buffer,
    wherein:
    when the data is transmitted to the second apparatus, the information processing section refers to the relationship information stored in the relationship information storage section, and specifies the second management information; and
    the transmission section refers to the second management information specified by the information processing section at the time of the data being transmitted to the second apparatus, and transmits to the second apparatus data stored at an address managed by the second management information.

4. The relay apparatus according to claim 3, wherein the information processing section reserves the relay transmit buffer at timing at which the relay receive buffer is reserved, and stores relationship information for the reserved relay receive buffer and the reserved relay transmit buffer in the relationship information storage section.

5. A relay method of relaying data transmitted from a first apparatus to a second apparatus by a relay apparatus, the relay method comprising:
    storing, when receiving data directed to the second apparatus from the first apparatus, the received data in a relay receive buffer storing data transmitted from the first apparatus,
    swapping an address of the relay receive buffer managed by first management information stored in a management information storage section for an address of a relay transmit buffer corresponding to the relay receive buffer managed by second management information stored in the management information storage section, the relay transmit buffer storing data to be transmitted to the second apparatus; and
    transmitting to the second apparatus data stored at the address managed by the second management information.

* * * * *